J. C. GARRETT.
VOTING MACHINE.
APPLICATION FILED JUNE 8, 1895.
1,131,363.
Patented Mar. 9, 1915.
6 SHEETS—SHEET 1.
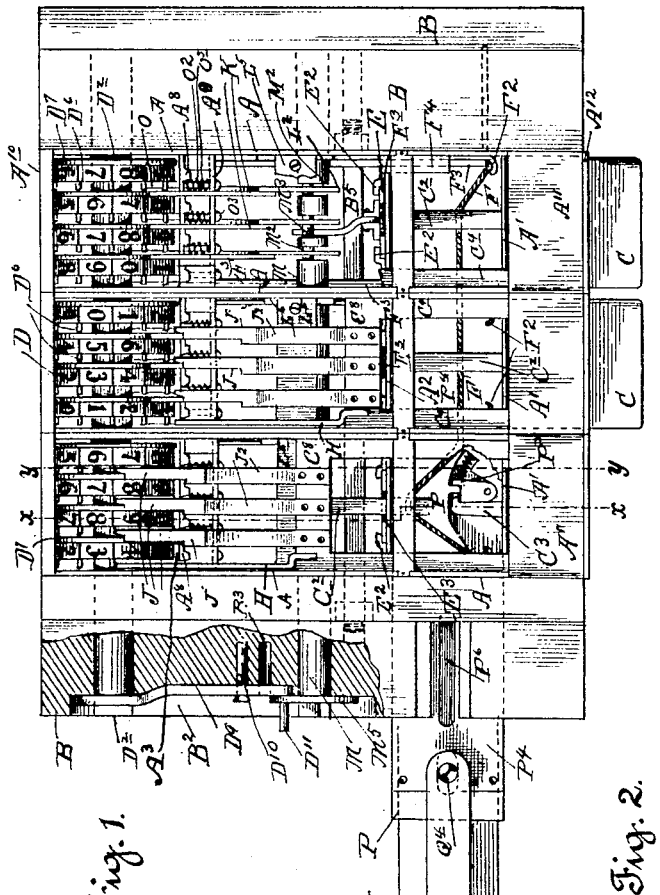
Fig. 1.
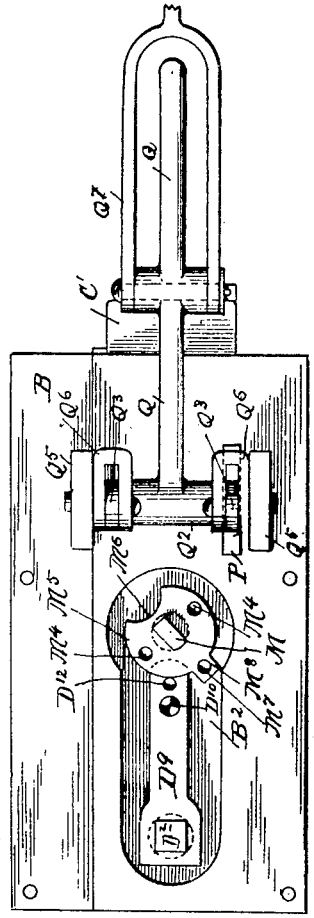
Fig. 2.
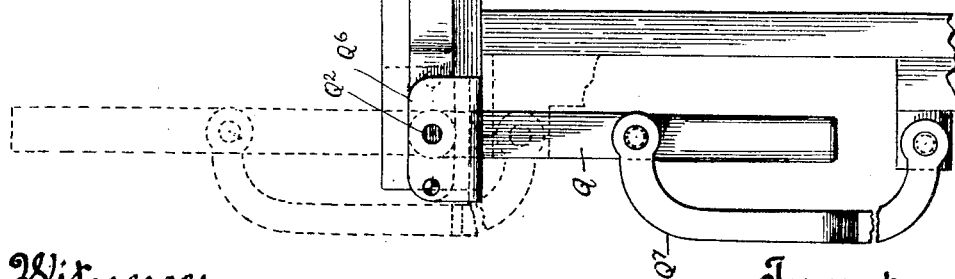
Witnesses.
Inventor.
James C. Garrett
by A. H. St. Marie
atty

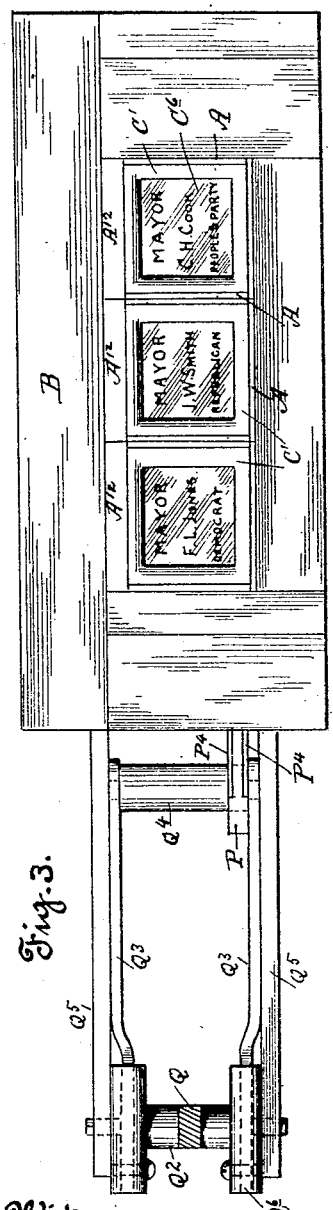
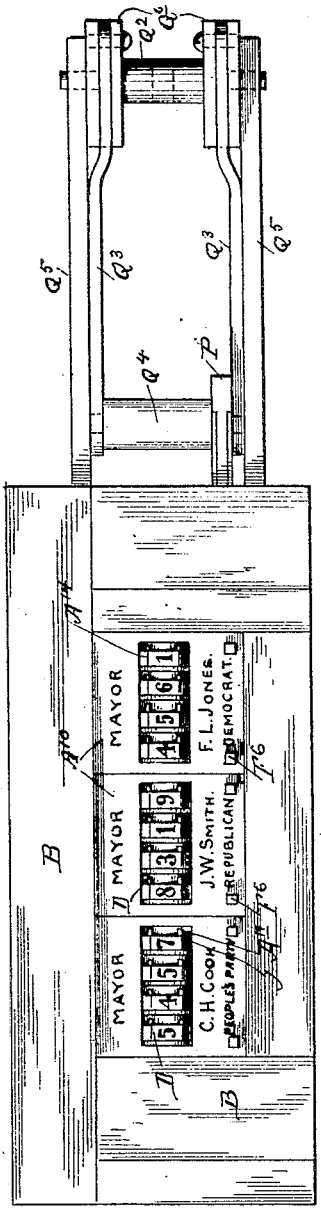
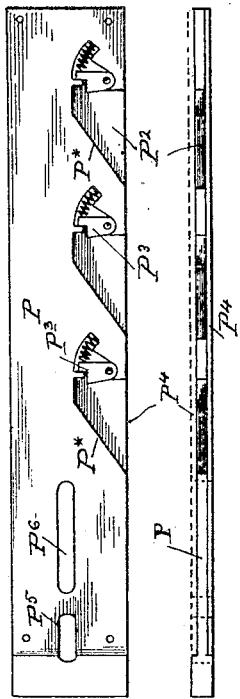

J. C. GARRETT.
VOTING MACHINE.
APPLICATION FILED JUNE 8, 1895.
1,131,363. Patented Mar. 9, 1915.
6 SHEETS—SHEET 4.
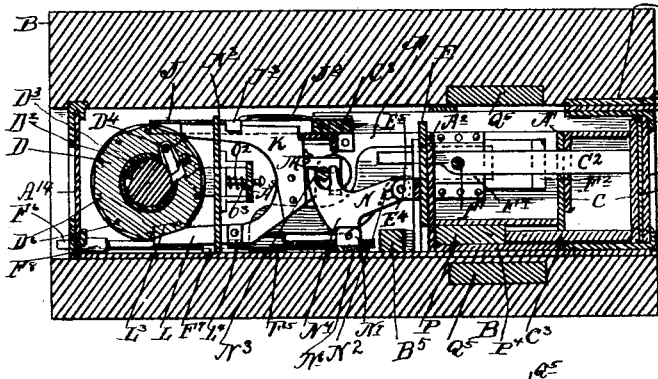
Fig. 10.
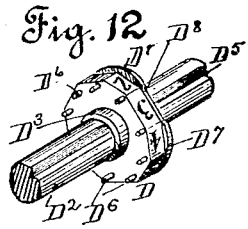
Fig. 12.
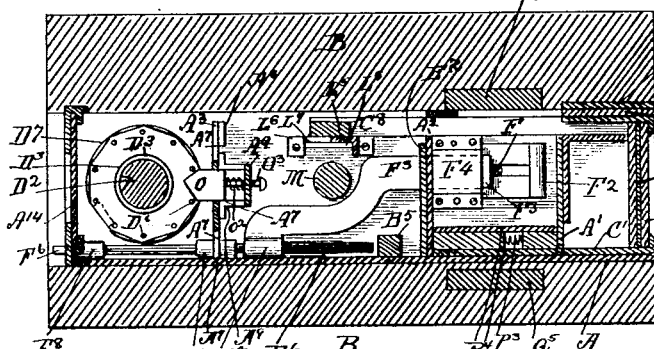
Fig. 11.
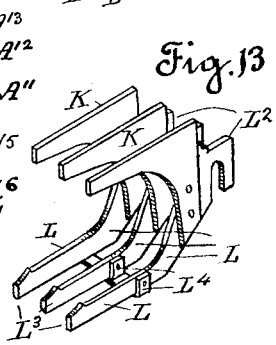
Fig. 13.
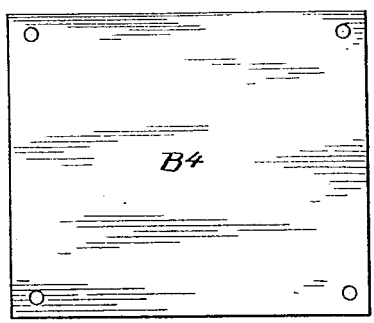
Fig. 14.
Fig. 15
Witnesses.
Inventor.
James C. Garrett
by A. H. Ste Marie
atty

UNITED STATES PATENT OFFICE.

JAMES C. GARRETT, OF SAN FRANCISCO, CALIFORNIA, ASSIGNOR, BY MESNE ASSIGNMENTS, TO GEORGE T. CRANMER, CLERK OF THE UNITED STATES CIRCUIT COURT FOR THE DISTRICT OF NEW JERSEY, TRUSTEE.

VOTING MACHINE.

1,131,363.  Specification of Letters Patent.  Patented Mar. 9, 1915.

Application filed June 8, 1895. Serial No. 552,153.

*To all whom it may concern:*

Be it known that I, JAMES C. GARRETT, a citizen of the United States, and resident of the city and county of San Francisco, in the State of California, have invented a new and useful Voting-Machine, of which the following is a specification.

The object of my invention is primarily, to provide a practical machine for voting by the Australian ballot system, although its operation is not necessarily confined to that system, as it is also adapted for use in "preferential" primaries, and similar elections.

Figure 7:
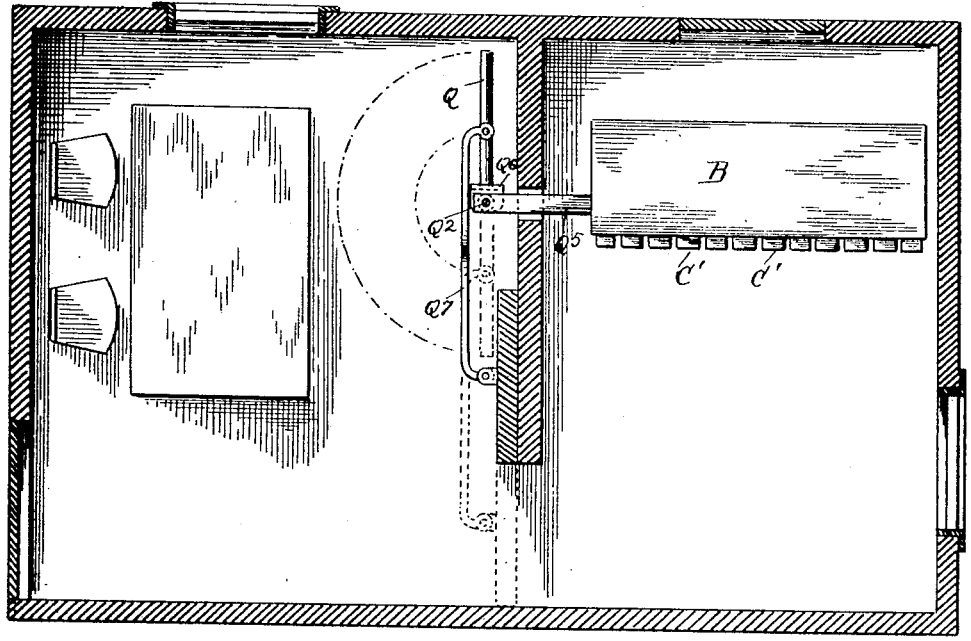
Figures 8, 9:
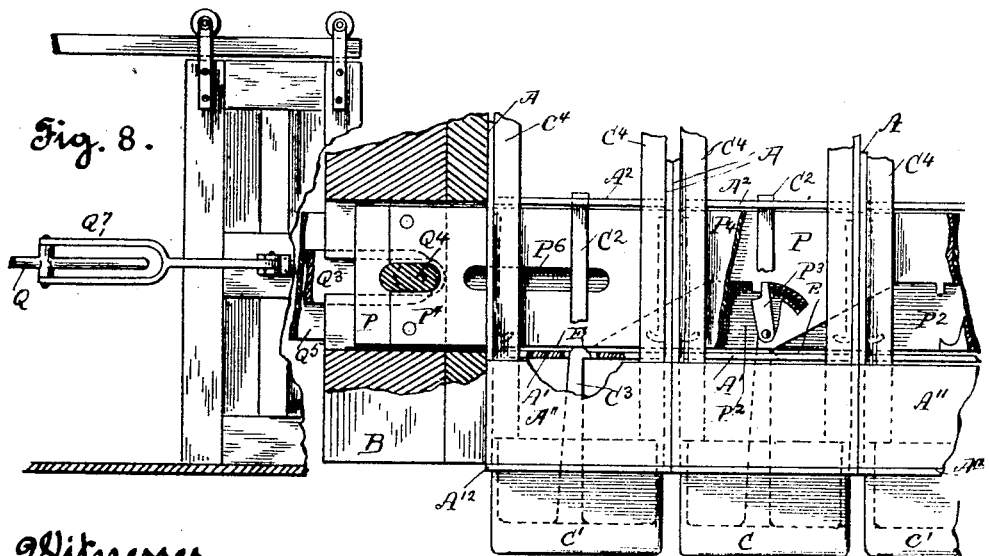
Figure 16:
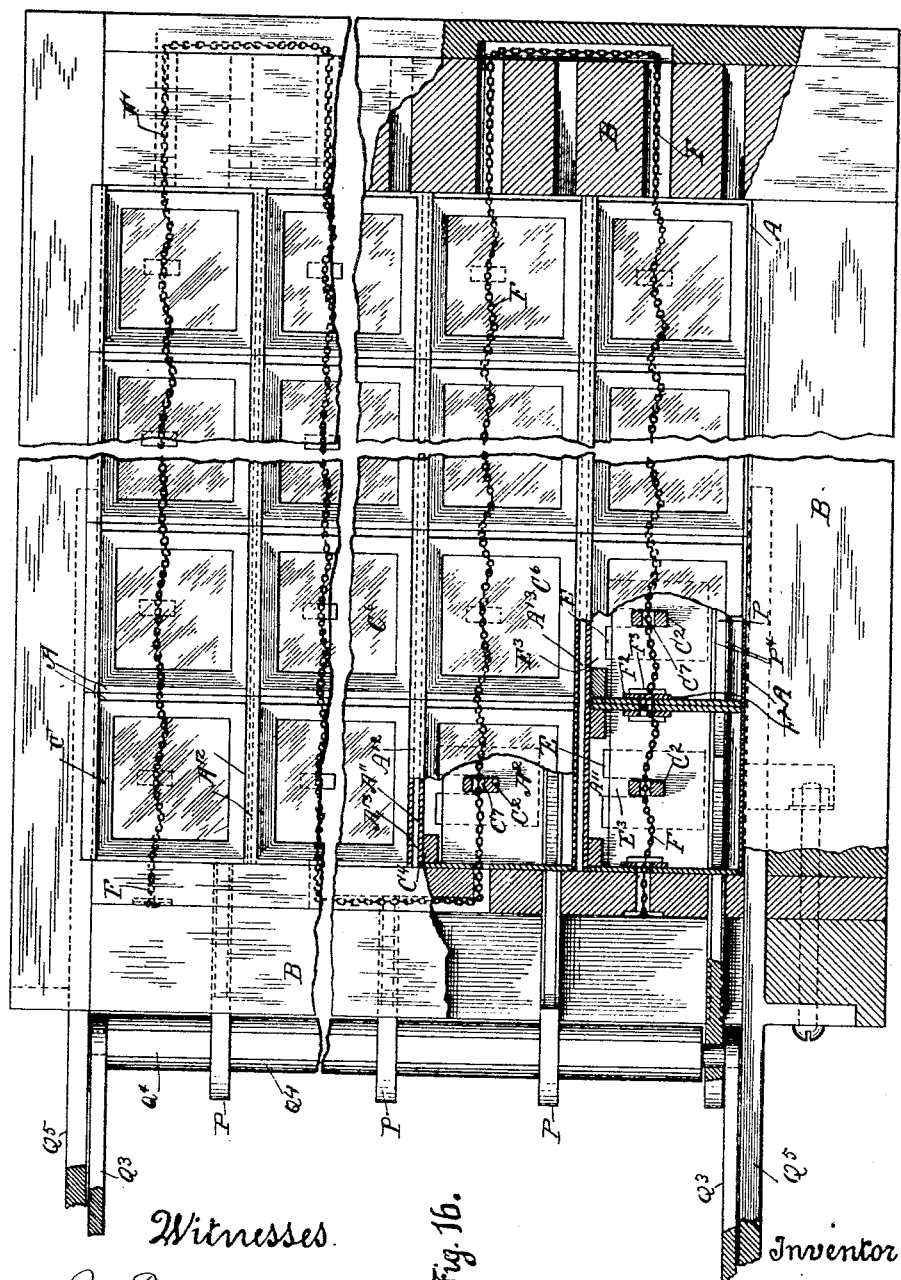
Figure 17:
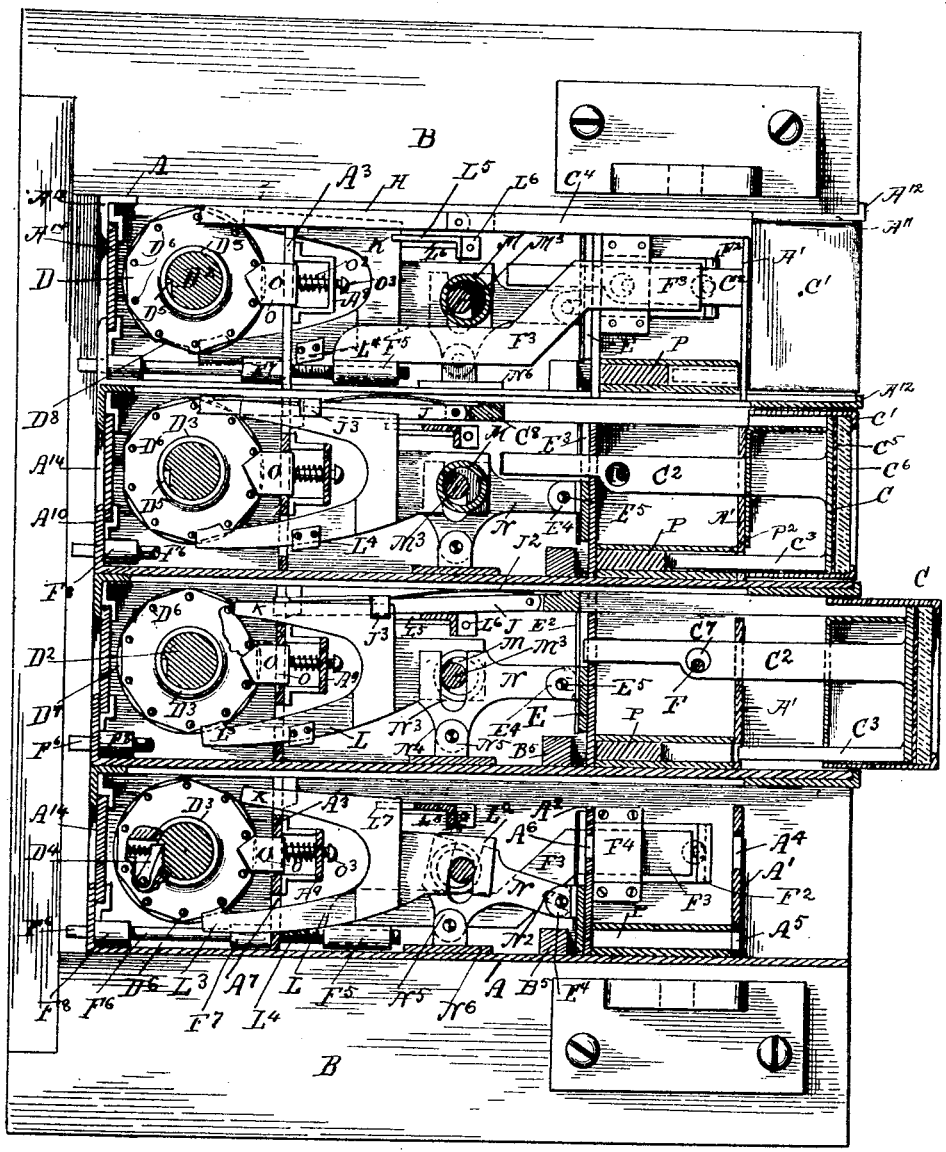

In the accompanying drawings, which are hereby particularly referred to and made a part of this specification, Figure 1 is a plan view of a small-sized machine embodying my said invention; in this view the cover to the mechanism is removed to disclose some of the internal parts of my invention, and a few of the parts are broken away for the purpose of showing what lies beneath them. Fig. 2 is a left side elevation of the same machine, with a small outside plate removed. Figs. 3 and 4 are front and rear elevations, respectively, of the same machine also. Fig. 5 is a detailed plan view of a sliding catch bar, used to lock the actuators of the machine when voted and then to restore them to their normal position when this bar is operated by one of the officers of election. Fig. 6 is a side view of the sliding bar shown in Fig. 5. (In Fig. 6 the location of the top plate to the sliding bar is indicated by a dotted line; this plate is removed in Fig. 5). Fig. 7 is a plan view of an election booth, showing an outer room for the officers of election, an inner room where my machine is located, the door separating these two rooms, and an operating lever connected with said door and also with the sliding bar aforesaid. Fig. 8 is a detailed elevation showing the manner in which the lever just mentioned is attached to the door, that separates the inner from the outer room of the booth. Fig. 9 is a sectional plan view of part of the machine, showing the sliding catch bar therein in the opposite extreme to that shown in Figs. 1, 3 and 4, and the mechanism that is used in connection with it to lock the actuators when voted, and then used by the officers of election to return them to their normal position after the elector has finished voting. Fig. 10 is a sectional side elevation of one section or case of my voting machine, taken on the line $x$—$x$ in Fig. 1. Fig. 11 is another sectional side elevation of a case, taken on the line $y$—$y$ in Fig. 1. Fig. 12 is a detail of one of the wheels that I use to register the votes, and the shaft it revolves upon, shown in perspective. Fig. 13 is a detail of three of the pawl-guides and lock-bars, that act upon the registering wheels. The upper arm of each of these devices is a pawl-guide and the lower arm is a lock-bar. Fig. 14 is a perspective detailed view of one of the actuators, showing the pawls or fingers that operate to turn the registering wheels, and also showing the hook that catches in the sliding bar and locks the actuator when it has once been voted. Fig. 15 is a detailed view of the plate that covers part of the side of the machine shown in Fig. 2. Fig. 16 is a front elevation of a larger machine than has been represented by the previous figures. Several portions in this figure are broken away to show how several tiers of cases containing actuators may be placed one above the other, and also to show the course of the chain which in my machine limits the number of actuators that can be pushed in by any one voter. Here is also shown the manner in which the sliding-bar of each tier of cases, in large-sized machines, is joined with the other sliding-bars and how all can be connected with one lever to be operated by the officers of election. The cards bearing the candidates' names (one of which is placed on the outer end of each actuator) are not shown here. As indicated by this figure, there may be any desired number of tiers, and any desired number of cases or sections in each tier. Fig. 17 is a sectional side elevation of one of my machines, having four vertical tiers. The upper actuator in this view is pressed in and the left side of the case containing it is removed, but all of the parts of the mechanism are in place. In the second case from the top the actuator is in the same position as in the top one, only a few of the parts on the outer side are removed, showing inner parts more plainly. The third case from the top is seen from about the same position as the second, only the actuator is out ready to be pressed in to register a vote. In the bottom section the actuator proper is entirely removed.

Wherever I use the word "actuator" in this specification, I refer to that part of my machine which is pressed in by the fingers and which then causes a registering wheel to turn one number. When I use the word "case," or "section," I refer to the subdivision of my machine which contains one actuator and its connected parts; several cases or sections, with actuators, etc., therein, are placed side by side and form a "tier;" and the machine complete may be made up of several tiers, as shown in Fig. 16.

Similar letters and numerals of reference indicate similar parts throughout the specification and drawings.

My machine is made up of separate sections or cases A, inclosed in any suitable box or frame, as B, and containing each an actuator C, and a set of registering wheels D operated thereby. My actuators are so constructed that each may be withdrawn from one case and inserted and operated in any of the other cases. The number of cases A in the machine is determined always by the number of candidates or sets of candidates to be balloted for and questions to be voted upon, so that there is provided one case, with its actuator and counting device, for each candidate or set of candidates and each question. As the number of candidates, and questions, is likely to vary with each election, I make the said cases entirely separate one from another, so they and the parts therein contained will be independent both constructively and operatively and therefore can be added to or taken from to suit the exigencies of any election. Having the cases completely independent of one another in this way, it will be seen that the small machine, for example, that is represented by Figs. 1 to 4, can very readily be enlarged by extending its top and bottom and placing its right-hand side farther away to enable it to receive a longer line of cases, such as appears in Fig. 7, and thereby accommodate an increased number of candidates running for office. The capacity of the larger machines, shown in Figs. 16 and 17, can likewise be increased, or diminished, by adding to, or subtracting from, their several tiers of cases, and making obvious alterations in the box or framework inclosing the same. My machine may thus have, at different times, one, two, or more rows, series, or tiers of cases, and its dimensions in every instance will be in keeping with the nature of the election that is going on.

As all the cases or sections A are alike, I shall describe only one of these cases or sections, and then show how a number of them are joined together to make up a voting-machine.

The two sides and bottom of each case A are made of metal; and the top is usually the top of the box B, that incloses all the cases in each machine, or the bottom of a superimposed tier of cases, if the machine is a large one. There are three metal partitions $A'$ $A^2$ $A^3$ across each case, for the purpose of giving it strength, and to hold and to guide the various inside parts in position. The first partition $A'$ is located near the front of the case, it being distant the length of the actuator head from the front. See Figs. 1, 10, 11 and 17. When the actuator C is pressed in, its head strikes against this partition and thus the actuator is only permitted to go in far enough to turn the registering wheel D one number. This partition, as best seen in Fig. 17, has a hole $A^4$ in its upper central part for a bar $C^2$ to pass through, and another hole $A^5$ in its lower central part for a hook $C^3$ to work in. The purpose and action of each one of these parts, $C^2$ and $C^3$, which belong to the actuator, will be described hereafter. The second partition $A^2$ is placed a little farther back in the case. Its chief function is to carry a lock-gate E, that prevents the voter from pulling the actuator C clear out or otherwise tampering with the internal parts of the machine. This partition also has a hole $A^6$, Fig. 17, in its upper central part, through which hole the bar $C^2$ works. As shown, the partitions $A'$ and $A^2$ do not come quite to the top of the case, but leave sufficient space for the two actuator-rods $C^4$ to pass above them. These actuator-rods $C^4$ are best shown in Fig. 14; their operation will be described later. The third partition $A^3$ is located just forward of the registering wheels D, which are near the back end of the case. Notches, slots, or incisions $A^7$, Figs. 11 and 17, are provided in its upper and lower edges and in its central portion, through which work the various pawls, pawl-guides, lock-bars, and wheel-checks, hereinafter described, that are used to turn the wheels D and to prevent them from registering more than one unit at a time. The particular function of this partition $A^3$ is to hold the above mentioned parts in their proper positions.

The actuator C shown in detail at Fig. 14 is constructed as follows: It has a square head with a detachable cap $C'$ thereon. This cap is constructed by forming a band of the shape of the head of the actuator— in this case rectangular—of suitable size for moving in and out easily within the front end of the case without friction. The front end of this band is turned inward at right angles to form flanges, as shown in the drawing. Inside of this band a piece of transparent material conforming to the shape of the end of the actuator, in this instance square, is inserted. Behind this transparent plate is the removable designating card, the card and transparent cover being held in place by the flanges. This card is provided with such inscription as the law may require for the instruction of the voter and is read through the transparent cover. The cap being thus in position it is fastened to the actuator by any means, said means being in such position that when the actuator is inserted in the cases and the lock-gate E is in its upward position the actuator cannot be withdrawn from the case, and the means which fastens the cap to the case is wholly inside the case beyond the control of the voter and thus the designating card is protected from molestation.

The bar $C^2$ is fastened to the upper central portion of the actuator head and projects backward through the partitions $A'$ and $A^2$. It is long enough so that when the actuator C is drawn out, as shown in Fig. 9 and in the third case from the top in Fig. 17, the inner end of said bar $C^2$ will extend through the partition $A'$ and through the partition $A^2$. Besides steadying the movement of the actuator C, this bar $C^2$ has a hole $C^7$ through it, between the partitions $A'$ and $A^2$, to allow a cord or chain F to pass through. This cord or chain is used to regulate the number of actuators in any particular set that the voter can press in—its action will be hereafter described. The two actuator-rods $C^4$ are fastened to the top of the actuator-head and pass back over the top of the partitions $A'$ and $A^2$, as before mentioned, one on each side of the case A. They are of such length that when the actuator C is drawn out, as shown in the middle section of Fig. 1, their inner ends extend a short distance beyond the partition $A^2$. Their said inner ends, back of the partition $A^2$, are connected by a cross-bar $C^8$. Whenever the lock-gate E is raised, its upper end projects above the upper edge of the partition $A^2$, as shown in Fig. 10, and whenever the actuator C is drawn out in a position to be voted, this upper end of the lock-gate E prevents the actuator C from being drawn clear out; when, however, the lock-gate is lowered the actuator may be withdrawn, as shown in the bottom section of Fig. 17, the cross-bar $C^8$ then passing easily over the top of the partitions $A^2$ and $A'$. The lock-gate E and its operation will be particularly described later. To the cross-bar $C^8$ are hinged the pawls H and J, that turn the registering wheels D, and extend backward so that their rear ends may engage the said registering wheels. There may be as many of these pawls and their accompanying wheels as is necessary—one pawl and one registering wheel for units, one each for tens, for hundreds, etc. The pawl H operates upon the "units" wheel and so is always in operation when the actuator is pressed in. The pawls J operate respectively the "tens," "hundreds," "thousands," etc., wheels. There is no limit to the number of votes that can be counted by my machine, it only being necessary to add another registering-wheel D and another pawl J for each column of figures. The pawls H and J fit in the slots or notches $A^7$ made in the top of the partition $A^3$, and are led through said slots or notches by triangular guides $A^8$, provided on the front of said partition. The pawl H is not necessarily spring pressed. On the other hand, the pawls J are held down by springs $J^2$, that are secured to the cross-bar $C^8$. These springs are provided to press the pawls J down at the proper time. Each of the pawls J is located adjacent to a pawl-guide K, which also passes through the slot $A^7$, as is shown in the second section or case from the top in Fig. 17. A flange $J^3$ is provided on the top of each of the pawls J so as to extend over and rest upon the top of the pawl-guide K that is beside it. The pawl-guides K are normally raised, and, by engaging the flange $J^3$ on the pawls J, they hold these pawls up above their registering-wheels D and prevent them from engaging said wheels, except once to every complete revolution of the wheel of lesser denomination next preceding. That is, the "tens" wheel is only permitted to move one numeral to every complete revolution of the "units" wheel, the "hundreds" wheel one numeral to every complete revolution of the "tens" wheel, etc.

The registering wheels D are mounted on a shaft $D^2$, that passes through the entire row or tier of cases A, as is best shown in Fig. 1. Each wheel has a hub $D^3$, so as to keep the wheels about one-eighth of an inch apart upon said shaft. The wheels are permitted to move freely in the direction they are turned by the pawls H and J. Each registering wheel is prevented from turning in the opposite direction by a lock-bar L and a spring-pressed dog $D^4$ that catches in a groove $D^5$ in the shaft $D^2$. The shaft $D^2$ is normally held stationary. The periphery of each of the registering wheels D is a ten-sided polygon, each side or face of which carries a number ranging in order from 0 to 9. Ten short pins $D^6$ project from the left side of each of these wheels, as you look at said wheels from the front of the actuator, and one of these pins $D^6$ is located just below each of the vertices of the angles formed by the sides of the polygon. The pawls H and J are adapted to engage these pins to turn the registering wheels when the actuator is pressed in. A circular flange or disk $D^7$, having a peripheral notch or depression $D^8$, is provided on the side of each registering wheel D, opposite to that from which the pins $D^6$ project. The pawl-guides K rest upon the periphery of this flange $D^7$. The registering wheel D, its hub $D^3$, its pins $D^6$, and flange $D^7$ are best seen in the perspective detail of said wheel shown in Fig. 12.

The pawl-guide K and the lock-bar L, previously referred to, are riveted together as shown in detail in Fig. 13, or they may be stamped together out of the same sheet of metal. They are pivoted on a rod M, that is cut away as shown at M², Fig. 1, to leave eccentrically disposed parts M³, over which are hooked the front ends L² of the several lock-bars. The rod M runs across the cases A about midway between the second and third partitions (A² and A³), and about midway between the top and bottom of each case. This rod finds its bearings in holes in the sides of the cases. The several pawl-guides extend backward and upward through the upper notches in the partition A³, as already described; and the connected lock-bars extend downward and backward, through the lower notches in the same partition, to a point beneath the registering wheels D. The pawl-guide K and its attached lock-bar L are not in the same vertical plane. The pawl-guide rides upon the flange D⁷ of the registering wheel next to the left of the one that is turned by the pawl J that rests upon said pawl-guide, while the lock-bar L connected with that pawl-guide K catches the pins of the registering wheel directly under the pawl J just referred to. Each of the lock-bars L has an upward projection L³ on its rear end adapted to enter between two of the pins D⁶ on the registering wheel next to the right of it, whenever the said lock-bar is raised as shown in Fig. 10 and the two top cases of Fig. 17. This prevents all the registering wheels from turning, except the "units" wheel. There is no lock-bar connected with the "units" wheel—it turns every time the actuator is pressed in. The lock-bar L is usually raised because it is secured to or made a part of the pawl-guide K. That pawl-guide is held up by resting upon the flange D⁷ of the registering wheel next to the left of the one that is caught by the lock-bar L connected with said pawl-guide. When however the registering wheel upon whose flange the pawl-guide rests has registered the number "9", the pawl-guide falls into the notch D⁸ in the flange D⁷, as indicated in the third section from the top in Fig. 17, and this allows the lock-bar L to also fall and release the registering wheel D next to the right of the one that has just registered "9". It also allows the pawl J that rests upon said pawl-guide to fall into position so as to engage one of the pins D⁶ on the wheel that has been released by the lock-bar. To illustrate, when the "units" wheel has registered 9 votes the notch D⁸ in the flange D⁷ on the "units" wheel will have come to such a point that the pawl-guide K, which has been resting upon that flange, will drop into that notch D⁸ and allow the pawl J supported by said pawl-guide to engage a pin D⁶ on the "tens" wheel, at the same time releasing the lock-bar L that has been holding the "tens" wheel. The next time the actuator C is pressed in, the "units" wheel will register "0", but the "tens" wheel will register "1"; and so on for the "hundreds" wheel, "thousands", etc.

A spur L⁴ is attached to the under side of each of the lock-bars L, except the last one, and extends beneath the lock-bar to the right of the one to which it is attached. This is to prevent the "tens", "hundreds", "thousands", etc., pawl-guides from falling before the proper time. For example, when the machine registers 90 the pawl-guide K that rests upon the flange D⁷ of the "tens" wheel would be in a position to drop into the notch D⁸ in said flange and thus allow the pawl J that rests upon said pawl-guide to engage the "hundreds" wheel; the next time the actuator would be pressed in the machine would register 191 instead of 91. The same thing would be true of the "hundreds", "thousands", etc., pawl-guides. But the spur L⁴ on the lock-bar that is attached to the pawl-guide K, which rests upon the "units" wheel, holds the pawl-guide that rests upon the flange D⁷ of the "tens" wheel up, until the "units" wheel has reached 9, when the machine registers 99; the "units" and "tens" pawl-guides then drop together and on the next vote the machine registers 100.

Over the hooked front ends of the lock-bars L is placed an angular or flanged plate L⁵, which extends across the case A and may be secured to the sides thereof in any suitable manner, resting for instance at the end on a bracket L⁶, to which it can be screwed, as shown in Fig. 1. See also Figs. 10, 11 and 17. The front edge or flange L⁶ of this plate is turned downward at a right angle so it will nearly contact with the pivoted ends of the lock-bars L, for the purpose of maintaining them in the required position on the rod M, when the machine is in operation. The rear edge of the plate L⁵ is notched, as at L⁷, for the purpose of keeping the lock-bars in a vertical position and allowing their upper edges to work forward and back in the notches of said rear edge of the plate. This plate also serves as a guide for the pawls H and J, when the actuators C are being inserted in their respective cases.

A check O is provided for each registering wheel D, to prevent the registering wheels from moving loosely or accidentally turning one way or the other. These wheel-checks consist each of a vertically disposed flat plate or blade, O, of a width slightly greater than the distance between the side pins of the wheel D, and beveled up and down, pointing rearward so that they can insert themselves between any two of said pins. They pass through suitable slots in the central part of the partition A³ and are urged against the pins of the registering wheels, each by a spring O², coiled around the shank O³ of each wheel-check, within a bracket A⁹, through which said shank passes and which is fastened to the front of the partition A³, as shown in Figs. 1, 10, 11 and 17. The wheel-checks O press on the pins D⁶ so that the registering wheels may be forced around but will not slip around. They check the momentum of the registering wheels as they are being turned by the pawls H and J of the actuators C. They also serve to keep the numerals on the registering wheels in proper alinement, prevent said wheels from turning back, and hold the several wheels in position as the dogs D⁴ thereof catch in the groove D⁵ of the wheel-shaft D², when the latter is turned to bring all the registering wheels to the zero point.

The reason for having the front end of the connected pawl-guide K and lock-bar L hooked over the eccentrically disposed portions of the rod M, is that by turning the said rod M the several pawl-guides and lock-bars may be drawn forward so as not to be in contact with the registering wheels D. The rod M may thus be turned by means of a wrench or key engaging holes M⁴ in a flange M⁵ provided on one end of said rod, as shown in Figs. 1 and 2. When the lock-bars are withdrawn from the registering wheels in this manner, the shaft D² upon which the registering wheels are mounted is also free to turn; and, by turning said shaft in the same direction that the registering wheels are turned by the pawls H and J, the dog D⁴ connected with each registering wheel D catches in the groove D⁵ in said shaft D², and all the registering wheels can be turned back to "0." The dog D⁴ of each registering wheel is directly beneath the same numeral on each wheel and so all the registering wheels are set turning at the same numeral. The position and working of this dog D⁴ and its connected parts are best shown in the bottom section of Fig. 17. The wheel-shaft D² may be turned by a crank or wrench D⁹, which is furnished with each machine. This crank or wrench, shown in Figs. 1 and 2, fits on a squared end of the shaft D², and when not in use is reversed and arranged to lie in a recess B² provided for it in the side of the box B. It has a handle D¹⁰, by means of which it is turned, and which enters a suitable hole in the side of the box, within the recess B², when said wrench is not in use. The end of the wrench, remote from the wheel-shaft, passes through a notch M⁶ in the edge of the flange M⁵ of rod M, and is covered by said flange when the said rod M is turned so the lock-bars L engage the registering wheels D. It will now be seen that the wrench D⁹ cannot be withdrawn from its recess, and the wheel-shaft D² turned, without first turning the rod M and withdrawing the lock-bars L from the registering wheels D, thereby preventing misuse of this part of the machine. A pin or screw-bolt D¹¹, adapted to pass through a hole M⁷ in a lug M⁸ of the flange M⁵, also through a hole D¹² in the wrench D⁹, and engaging a hole or nut B³ in the side of the box B, is provided to lock the said flange and wrench together and keep the rod M and shaft D² from being turned when the machine is registering the votes. The plate B⁴, shown in detail in Fig. 15, is fastened over these parts and covers them so that they can only be reached by the proper officer, when he removes said plate B⁴.

The rod M also operates the lock-gate E. This lock-gate works up and down in guides E² on the rear side of the partition A², as is best shown in Figs. 1 and 17. It is made with a notch E³ in its upper end so as to permit it to move up and down on each side of the bar C², that projects rearwardly from the upper central portion of the actuator-head. Two lugs E⁴ are fastened to the rear side of said gate below the lower end of the notch E³, and the front end of a lever N works between them. This lever N has a slot N² in said front end to engage the pin E⁵, that passes through both of the lugs E⁴,—this slot N² is to allow play for the pin E⁵ as the lock-gate moves up and down. A notch N³ is also provided in the upper side of the lever N, near its rear end, to fit up over an eccentric portion M³ of the rod M— this notch permits play as the rod is turned. A projection N⁴ extends downward from the lower side of the rear end of the lever N (beneath the notch N³, that engages the rod M). This projection N⁴ is fulcrumed to lugs N⁵ formed on a plate N⁶, secured to the bottom of the case A. When the rod M is turned one way it will operate the lever N so as to lower the lock-gate E, as shown in the lower section of Fig. 17; or turn it the other way and it will cause the lever N to raise the lock-gate E to the position in which it is shown in Fig. 10. The rod M is so made that, when the lock-gate E is raised, the lock-bars L and their connected pawl-guides K are back in a position to perform their respective functions upon the registering wheels D; when the lock-gate is lowered the lock-bars and pawl-guides are drawn forward so as to clear the registering wheels. The lock-gate E, when raised, engages the cross-bar C⁸ of the actuator C when the latter is forward in a position to be voted, and thus prevents the voter or meddler from pulling the actuator clear out. But whenever it becomes necessary for the proper authorities to remove the actuator, it can be easily done after turning the rod M and thus lowering the lock-gate E.

Each actuator C, as it is pressed in, is locked by means of the hook $C^3$ catching in a notch in the sliding bar P. This hook is secured to the lower central portion of the head of the actuator C, and extends a short distance backward through the hole $A^5$ in the partition $A'$. The sliding bar P extends across the entire tier of cases A and projects somewhat beyond the tier in the direction of the station of the officers of the election, when the actuators are unlocked. It is shown in detail in Figs. 5 and 6; Fig. 5 being a plan view, and Fig. 6 a side view. This sliding bar P fits in recesses cut in the lower edges of the sides of the cases between the partitions $A'$ and $A^2$. It has as many notches $P^2$ in its front edge as there are sections or cases in the tier. (There is one of these sliding bars to each tier of sections or cases). Each notch $P^2$ has a bevel or inclined side $P^*$ extending toward the station of the officers of election. A spring-catch $P^3$, made to engage the hook $C^3$, is located in the back of each notch $P^2$, as is best shown in Fig. 5. A thin plate of metal $P^4$ is fastened to the under side of this sliding bar and another similar sheet is fastened to its upper side to protect the spring-pressed catch $P^3$. This upper sheet is shown in Fig. 6 by the dotted lines, and by full lines in Figs. 1, 10, 11 and 17. The sliding-bar P is slid in and out by the officers of election every time an elector has cast his vote, and operates as follows:—The hook $C^3$ fits in one of the notches $P^2$, between the plates $P^4$. If the sliding-bar P is drawn out, as shown in Fig. 1, when the actuator C is pressed in, this hook $C^3$ will come into contact with and engage the spring catch $P^3$, as is best shown in the left section in Fig. 1, and thus will lock the actuator so that it cannot be pulled out again and voted by the same elector or voter. If the sliding bar P is not drawn out in the position shown in Fig. 1, the hook $C^3$ will strike against the unmutilated edge of said bar and prevent the actuator from going in to operate upon the registering wheels D—this prevents anybody voting before the officers have arranged the machine for him. The actuator being locked in by the hook $C^3$ and the spring catch $P^3$, as just described, it remains locked until the sliding bar P is forced in, when the hook $C^3$ is released from the spring catch $P^3$ which is pushed away from it (out of contact), and the bevel part of the notch $P^2$ operates upon the rear end of this hook $C^3$ and forces the actuator out in a position to be voted again. When the sliding bar is thus forced in, all the actuators are out in a position as if ready to be voted, but they are locked in that position (as is shown in Fig. 9), until the sliding bar P is again drawn out. This is because the inner end of the hook $C^3$ of each actuator rests upon the uncut front edge of the sliding bar P. The hooks $C^3$ are so placed with regard to the notches $P^2$ that, when the sliding bar P is forced in as far as it will go, it has drawn all the actuators out as far as they will go.

The sliding bar P may be moved in and out by a lever Q, secured to a rock-shaft $Q^2$. The rock-shaft $Q^2$ is journaled in the outer ends of two bars $Q^5$, that extend from the main framework of the machine. The pitmen $Q^3$ are attached to the outer end of the sliding bar P, by means of the connecting shaft $Q^4$, which passes through the inner ends of said pitmen and through the hole $P^5$ in the outer end of said sliding bar; the outer ends of the pitmen $Q^3$ are connected to jaws $Q^6$ of the rock-shaft $Q^2$ in such a way that when the lever Q is swung one way it will force the sliding bar P in—when it is swung the other way it will force the sliding bar P out. In the present instance the outer ends of the pitmen $Q^3$ are shown as being eccentrically pivoted to the jaws $Q^6$. If it is a sliding door that separates the inner compartment of the booth, where my machine is located, from the outer compartment, where the judges and officers of election are, it may also be attached to the lever Q by a rod or looped connection $Q^7$, shown in Figs. 1, 2, 7 and 8, so that the door or screen and the sliding rod are moved simultaneously, the moving of one automatically operating the other. When thus connected, the actuators can only be pressed in and votes registered when the door is closed, because as soon as the elector has finished voting the door is opened by swinging the lever to the position shown in Fig. 7; this forces in the sliding bar P and it restores the actuators out in a position to be voted and holds them there until the sliding bar is again drawn forward; but inasmuch as both the door and the sliding-bar P are connected with the same lever Q, the sliding rod cannot be drawn forward before the door of the booth is closed.

While I have shown a door as covering up or closing the machine or actuators when a voter is in position to operate the actuators and cast his vote, it is to be understood that any other means—for example, a barrier or a screen—may be used. The object of the door, barrier, or screen is to cover up or obscure the actuators and voter when a voter is casting his vote so that his ballot may be secret. I have shown a lever for simultaneously operating the door, barrier or screen, and means for setting and releasing the actuators, but other means may be substituted therefor. In fact, in operating the machine this lever is not necessary. It is only necessary that there should be a connection between the door or screen and the means for setting and locking and unlocking the actuators so that the door or screen and said means may be moved simultaneously. The door or screen may be pulled or moved to cover and uncover the actuators without the use of a lever or hammer. This may be done by simply taking hold of the door or screen. It is only necessary that some means be provided for automatically unlocking the actuators when a voter approaches the machine, and for locking them when he leaves the machine. Broadly considered, the means for pushing out and locking the actuators, so that they cannot be voted, and for unlocking them so that they can be voted, is automatically operated and this automatic operation takes place when one voter leaves the machine after he has voted and when another approaches the machine for casting his vote, the actuators being locked during the time the door or screen is withdrawn and unlocked during the whole time the door or screen covers the actuators and the voter is in the booth or has access to the actuators for the purpose of voting.

The chain F is provided to limit the number of candidates for the same office or board that one elector may vote for. To illustrate, say there are three candidates for the same office and each elector is only entitled to vote for one—the chain F will prevent the voter from voting for two or more. This chain or cord is passed through the tier of cases A, as is shown in its simplest form in Fig. 1. It is fastened in the frame of the machine at one side of the tier and passes through holes in the sides of the cases, between the partitions $A'$ and $A^2$, and through a hole $C^7$ in each one of the bars $C^2$ attached to the actuators C; finally the other end of the chain is secured to the other side of the frame of the machine. This chain is at all times covered by the other parts of the machine so that the voter can never get hold of it or meddle with it. When an actuator is pressed in, the bar $C^2$ carries a portion of said chain backward with it and thus tightens the whole chain, as is shown in Fig. 1. If another actuator were pressed in it would further tighten the chain F, but cannot be pushed in far enough to vote. By pressing the desired number of actuators in (one in Fig. 1) and then drawing the chain tight and fastening it, I make it impossible for any greater number of actuators in that set to be pressed in, because the chain passing through the hole $C^7$ in the bar $C^2$ would not permit it. This chain F slides freely through the holes in the sides of the cases and also through the holes $C^7$ in the bars $C^2$, so that one voter might vote the left actuator, as shown in Fig. 1, and the next might vote the middle one or right one. In each case the actuator that happened to be pressed in would draw the chain F so tight as to prevent either of the others from being pressed in. If I desired to permit each voter to vote for two or more candidates instead of one, I would simply press in the required number of actuators and then tighten my chain accordingly. F may be either a chain, a small rope, or a cord as preferred in each case.

To further tighten the chain F and to adjust it to a nicety, I have provided a stop $F^2$ on the inner surface of each side of each case A, just in front of the hole in said side through which the chain F passes. This stop is curved inward and backward as shown in the right section of Fig. 1. A clamp $F^3$ works in a loop $F^4$, attached to the side of the case A just back of the stop $F^2$, and moves from the back of the case forward against said stop $F^2$. The chain F is thus caught between the stop $F^2$ and the clamp $F^3$. No particular shape is required for the clamp $F^3$ except that it extends back along the side of the case, almost to the partition $A^3$ and it must keep out of the way of the rest of the machinery. The form of clamp shown in Fig. 11 and in the upper section of Fig. 17 fulfils these requirements. It passes along the middle of the side of the case A, through the partition $A^2$, then obliquely downward beneath the rod M, and thence back, having a threaded part $F^5$ formed on the underside of its rear end. A bolt $F^6$ passes through the lower part of the back end of the case, through the partition $A^3$, and screws through this threaded part $F^5$. Two shoulders or collars are formed on this bolt $F^6$; one $F^7$ to rest against the rear surface of the partition $A^3$, the other $F^8$ to rest against the front surface of the rear end $A^{10}$ of the case. A wrench may be applied to the rear end of the bolt $F^6$. The bolt $F^6$ is prevented by the shoulders $F^7$ and $F^8$ from moving backward or forward as it is turned, accordingly said bolt screwing in the threaded part $F^5$ will slide the clamp $F^3$ forward or back, as the bolt is turned to right or left. When the clamp $F^3$ is screwed forward, as just described, the chain F is caught in between said clamp and the curved stop $F^2$, and held firmly between the clamp and stop.

The length of the chain F may be regulated for the purpose of limiting the number of actuators that can be pressed in for each group, by pressing the determined number of actuators, drawing the said chain F taut and fastening it by clamping it between two of the stops $F^2$ and screw-clamps $F^3$. Thus, for the sake of illustration, take the simple case where there are three candidates for one office and each elector is permitted to cast one vote, the chain is run through the cases A, passing through the opening $C^7$ in each bar $C^2$, as previously described, and the clamp $F^3$ on the left side of the left actuator, for example, is forced forward by means of the bolt $F^6$ connected with it and that forces the chain F against the stop F² so as to firmly hold it between the clamp and stop. One of the actuators is then pushed in to its fullest extent, the chain pulled taut and the clamp F³ on the right side of the right actuator is likewise screwed forward to hold the other end of the chain firmly against the right clamp and its hook F². The chain cannot slip when thus held between the clamps and their respective stops. When a larger machine is used with the cases arranged in more than one vertical tier, the chain F is then passed on through the rest of the sections or through the entire machine, as shown in Fig. 16, being thus clamped on each side of each group of actuators. One group of actuators is set apart to each office or board to be filled by the election. Care is taken after the actuators have been pressed in and before the first vote is cast to adjust the chain F to aline the registering wheels D to O just before voting. Of course where there is more than one actuator to be operated in voting and where the cases or sections are arranged in tiers such as shown in 16, to make a large machine, only the ends of the chain are clamped.

Where the machine is made up of several tiers of cases, as shown in Fig. 16, the chain F could start at one end of the top tier (or bottom tier, immaterial which), run through that tier down through a passageway formed for it in the framework at the end of the tier to the tier below, through that tier, etc., until it passes through every section in the machine. Also, where there are several tiers in the machine there is a sliding bar P for each tier. Each of these sliding bars has an elongated slot P⁶, through which the chain F passes, wherever it crosses them. As shown in Fig. 16, the several sliding bars P are connected by one shaft Q⁴ and operated by the same pitmen Q³.

All of the sections that make up one machine are inclosed in a suitable box or frame B, and, to further strengthen the machine and keep the several sections thereof properly alined for the sliding bar to work through the same, a rod or bolt B⁵ runs through each tier, passing through the lower part of each section just back of the partition A². A nut may be provided on one or both ends of this bolt B⁵ to tighten it by. This is best shown in Fig. 1. Across the top of each case, and secured to the upper edges of it, is also provided a small plate A¹¹, which extends from the front of the case rearwardly to a point above the partition A' and forms with the bottom and sides of the case a suitable inclosure for the head of the actuator C. Each plate A¹¹ has an upwardly-turned flange A¹², upon which may be placed any desirable inscription. Where such flange is made wide for a large inscription I place upon the plate A¹¹ back of it another plate A¹³, which, when the box or frame B contains two or more tiers, serves to keep the different tiers sufficiently separate from one another for the actuators in the upper tier or tiers to clear said flange A¹² in sliding in and out of their cases, but when the said flange is omitted, or made narrow as indicated in Fig. 17, the plate A¹³ is also omitted. This plate A¹³ is shown in Figs. 10, 11, and 16. At their rear end A¹⁰ the several cases A are further provided each with a glass plate or other transparent material A¹⁴, covering an aperture, through which the numbers on the registering wheels D can be read. The end A¹⁰ of each case is labeled to correspond with the designating card C⁵ on the front end of the actuator therein, as indicated in Figs. 3 and 4.

While the election is in progress the officers are in the outer compartment of the voting booth to supervise and to operate the door or screen. They move the door or screen so as to permit each elector to have access to the machine or actuators. While the door or screen uncovers the actuators the sliding bar P is in and the actuators C are all out in a position to be voted and are locked there until the sliding bar is again drawn out, when the door or screen covers the voter and the actuators. When the sliding bar is drawn out the screen covers up the actuators and unlocks the actuators, as has already been described. That is, when an elector has entered the inner compartment of the booth where the voting machine is, he can press in a predetermined number of actuators. Each time he presses in an actuator he registers a vote for the candidate whose name is upon the front of the actuator head. After he has finished voting the sliding door is again opened by the officers to permit him to leave the booth, this act forces in all the sliding bars P of the machine (there is one for each tier of actuators) and restores to their original position all the actuators he has pressed in. It is thus seen that, when the door is open or the screen removed from the actuators no one can tell for whom the elector has voted and the machine can be inspected to ascertain its condition—insuring the absolute secrecy of the ballot and at the same time guarding against any interference with the machine. This process is repeated every time an elector casts his vote.

The exact standing of the vote in a precinct may be taken at any time during the progress of the election, that is to say, whenever permitted by law to do so, and at the instant the last elector steps out of the inner compartment of the voting booth the exact vote of the precinct can be ascertained, by simply looking through the glass in the rear of the machine, and reading the numbers shown by the various registering-wheels D—there is no counting of ballots, no chance for fraud, no counting out of a candidate by the election officers.

After the last elector has voted the sliding bars are pressed in and disconnected from the means which operate them, and the other ends of the said bars are securely locked and sealed to prevent them from being tampered with. As long as the sliding bars P are thus sealed in, the actuators cannot be moved a particle, because the hooks $C^3$ are bearing against the uncut portions of said sliding bars, as has been before described.

Most all of the systems of voting used in the United States can be grouped under one of seven different heads—some used in one State, some in another. My machine is suitable for all of them, as will be readily seen.

*1st. The single candidate voting.*—If there are several candidates for the same office, as for mayor or governor, each elector is entitled to cast one vote for one of the candidates for the office. The adaptation of my machine to this system of voting requires no further explanation.

*2nd. Where there are several members of the same board or commission to be elected, as in a city where there are eighteen supervisors elected.*—In this case the elector is only entitled to vote for eighteen persons for the office of supervisor. If, however, there are five political parties and each has nominated eighteen men, that would make 90 candidates to fill the 18 positions. Here the chain F must run through all the 90 actuators, and its length be so regulated that only 18 of the actuators can be pressed in. If the 90 actuators are arranged in more than one tier, the chain F may pass from one tier to another as shown in Fig. 16.

*3rd. Minority voting.*—For example, if there are seven positions on a board or commission to be filled, each voter may only be permitted to vote for four candidates. In this instance I regulate the length of the chain F so that it will only permit four actuators, of all that are provided for the candidates for that particular board, to be pressed in.

*4th. Cumulative voting, as followed in the election of representatives to the general assembly of the State of Illinois.*—Here each voter is permitted to cast three votes for any one of the candidates, or one and one half votes for each of two candidates, or one vote for each of three candidates. The State is divided into districts and each district is entitled to three representatives. To satisfy this requirement of the law, I devote six actuators to each candidate and label each actuator "one-half vote". To cast three votes for John Smith in this case, the elector presses in all six of the actuators that are labeled "John Smith, one-half vote". To cast one and one half votes for each of two candidates, he would press in three actuators for each, etc. To ascertain the true vote, I add together all the numbers registered by the several registering wheels D that are devoted to the same candidate and divide that sum by two. The length of the chain F is so regulated that only six actuators in that particular set can be pressed in—if the elector devotes them all to one candidate he can vote for no one else for the same office.

*5th. Independent candidates, that is, candidates who have not received a nomination by any one of the political parties.*—Example: In California a person is entitled to have his name placed upon the ballot for any office, if he presents a petition to the proper authorities signed by a number of voters equal to at least three per cent. of the votes cast at the next preceding general election in the political district in which he is running. If he is running for a county office he must present a petition signed by at least three per cent. of the voters of the county; if for a State office, by three per cent. of the voters of the State, etc. In such case actuators are provided for the independent candidates in the same groups with the candidates for those particular offices who have been regularly nominated by some party, only instead of having the party designation, as Democratic or Republican over their names, I place the word "Independent".

*6th. Voting for or against a proposition that is submitted to the people, as for example a bond issue or a constitutional amendment.*—In this case I label one actuator "No" and the other "Yes" or one "For" and the other "Against".

*7th.*—In many of the States the law requires that each candidate shall have the same degree of prominence upon the ballot and that all the candidates for the same office shall be grouped together and follow each other in alphabetical order. As can clearly be seen from the foregoing specification, my machine is peculiarly adapted to fulfil these requirements of the law.

The main advantages of my machine lie in its simple construction, the impossibility of its making a mistake, its durability, and the fact that no one except the proper authorities can get at the registering wheels to tamper with them. My machine has no delicate springs that can get out of order and no complicated cog-wheel or lever system. The actuator acts in a direct line upon the registering wheels. The manner of voting with my machine is so simple that it is scarcely possible to imagine a voter so ignorant that he could not understand it. There is no opportunity for him to get confused, as he now does in marking his ballot, where the Australian ballot is used. All he has to do is to press the actuators in and they immediately register his vote—he cannot, if he wants to, vote for too many persons for the same office and thus invalidate his ballot; nor can he place any "distinguishing marks" (which have become such a lamentable feature of recent elections) upon his ballot.

The registering mechanism is not specifically claimed herein, inasmuch as the same constitutes the subject-matter of a divisional application, about to be filed.

While I have shown a certain apparatus for carrying out my invention, yet I do not intend to confine myself to the exact details therein shown and set forth in this specification as many of the features of my apparatus are broadly new and any one skilled in the art having my invention before him could readily make changes therein without departing from the spirit of my invention.

Having now described my invention, what I claim as new and desire to secure by Letters Patent is:—

1. A voting machine composed of tierable cases, individually aggregable and removable, each case having its independent counting device and actuator therefor, and means to permit only a predetermined number of actuators to be operated, substantially as described.

2. A voting machine composed of a plurality of separate cases each having its independent counting device and actuator therefor, each case representing a candidate, and each of said cases being removable from the machine, and means to permit only a predetermined number of actuators to be operated substantially as described.

3. A voting machine composed of a plurality of separate cases each having a counting device and an actuator, each case being removable from the machine and means to permit only a predetermined number of actuators to be operated.

4. A voting machine composed of separate cases, adapted to be arranged in either a horizontal or vertical tier, each case being adapted to be placed in and removed from the machine, each case having its independent counting device and actuator and means to permit only a predetermined number of actuators to be operated.

5. A voting machine composed of a series of cases, each case being separate one from the other, each case having a counting device and actuator independent, both constructively and operatively, so that the cases can be added to or taken from the machine to suit the exigencies of an election and means to permit only a predetermined number of actuators to be operated.

6. A voting machine composed of a plurality of separate cases, each case having its independent counting device and actuator, each case having a bottom and two sides, and open at the top, said cases being adapted to be arranged in tiers so that when so arranged the bottom of one case will form or close the top of the case next below it and means to permit only a predetermined number of actuators to be operated.

7. A voting machine composed of a plurality of separate cases, each case having its independent counter and actuator, each case having a bottom and two sides and open at the top, said cases being adapted to be arranged one above the other so that when so arranged the bottom of one will form or close the case next below it, and a cover to close the top of the upper case and means to permit only a predetermined number of actuators to be operated.

8. An actuator for a voting machine, a case therefor, a designating card on the actuator and means to protect and hold the card in place on the actuator, said means being inaccessible to the voter after the actuator has been inserted in the case so that the card cannot be tampered with.

9. An actuator for a voting machine and a case therefor, said actuator having a designating card thereon, a transparent cover for said card and means to hold the cover in place and to prevent the card from being tampered with after the actuator has been inserted in the case.

10. An actuator for a voting machine and a case therefor, said actuator having a designating card thereon, a transparent cover for said card and a cap to hold the cover and card in place to prevent the card from being tampered with after the actuator has been inserted in the case.

11. An actuator for a voting machine, a case therefor, a removable designating card on the actuator, a transparent cover for said card, and means to hold the cover in place, said means being removable before the actuator is inserted in the case so as to permit the card to be changed, and non-removable after the actuator has been inserted in the case so that the card cannot be tampered with.

12. An actuator for a voting machine, a case therefor, a removable designating card thereon, a transparent cover for said card, and a cap to hold the cover in place, said cap being removable before the actuator is inserted in the case so as to permit the card to be changed, said cap also preventing the cover from being removed after the actuator has been inserted in the case, so that the card cannot be tampered with.

13. An actuator for a voting machine, a case therefor, a removable designating card for the head thereof, a transparent cover for said card, a cap having an inwardly projecting flange which fits over the edge of the cover to hold said cover in place, the main portion of the cap extending over the sides of the head of the actuator and conforming to the shape thereof, and means to hold the cap on the actuator head said means being inaccessible to the voter when the actuator is in the case.

14. An actuator for a voting machine, a case therefor, a removable designating card on the head thereof, a transparent cover for said card, a cap consisting of a band shaped to conform to the outline of the actuator head, the said band having flanges to hold the cover in place, and means to hold the cap in place, said means being inaccessible to the voter when the actuator is in the case.

15. A voting machine comprising a suitable number of cases, a counting device for each case, an actuator for each counting device, a designating card on the actuator, a transparent cover for said card, and means to prevent the card from being tampered with after the actuator has been inserted in the case.

16. A voting machine comprising a suitable number of cases, a counting device for each case, an actuator for each counting device, a designating card on the actuator, a transparent cover for the card, means to prevent the card from being tampered with after the actuator has been inserted in the case, and means to prevent the withdrawal of the actuator from the case beyond a fixed limit.

17. A voting machine comprising a suitable number of cases, a counting device for each case, an actuator for said counting device, said actuator having a transparent cover designating card on its front end, and a cap thereon within the case, and means to prevent the withdrawal of the actuator from the case beyond a fixed limit, substantially as described.

18. A voting machine comprising a suitable number of cases, a counting device for each case, an actuator for said counting device, a removable designating card, a transparent case over said card, a cap to hold the cover in place, said cap consisting of a band surrounding the head of the actuator and fitting neatly within the end of the case and of such width that the inner edge thereof projects back beyond the front end of the case when the actuator is in position for voting, said cap having flanges projecting over the edges of the cover, and means to hold the cap in place, said means being within the case beyond the control of the voter when the actuator is in position for voting.

19. A voting machine composed of a suitable number of cases, each case having its independent counting device and actuator therefor, each actuator being withdrawable from one case and insertible and operable in any of the other cases, and means to permit only a predetermined number of actuators to be operated.

20. An actuator for a voting machine having a bar thereon, said bar having an opening therein and a hook on the bar adapted to hold the actuator in a locked in position when the actuator has been pushed in for voting.

21. A voting machine comprising cases, a counting device in each case, an actuator for said counting device carrying a hook, and a bar movable across the cases carrying catches arranged to engage with hooks of the several actuators, substantially as described.

22. In a voting machine, a counter, an actuator for the counter, a device movable across the path of the actuator, and means on the actuator adapted to lock said actuator without moving said device.

23. In a voting machine, a counter, an actuator for the counter, a device movable across the path of the actuator, means on said device and means on the actuator adapted to engage said means on the device movable across the actuator, for locking the same without moving said device.

24. In a voting machine a counter, an actuator for the counter, a bar adapted to push out and to hold the actuator in a locked in position when it has been pushed in for voting, a barrier, and means connecting the barrier and bar so that upon moving the barrier the bar will be operated.

25. In a voting machine, a counter, an actuator for the counter, a sliding bar adapted to push out and to hold the actuator in a locked in position when it has been pushed in for voting, a barrier, and means connecting the bar and barrier so that when the barrier is moved the bar will be operated.

26. In a voting machine, a counter, an actuator for the counter, a bar, means on the actuator adapted to engage the bar, to hold the actuator in a locked in position when it has been pushed in for voting, without moving the bar.

27. In a voting machine, a counter, an actuator for the counter, a sliding bar, and means on the actuator to engage the sliding bar when the actuator has been pushed in for voting, and to hold it in said position, said actuator being operated and locked in without moving the bar.

28. In a voting machine, a counter, an actuator for the counter, a sliding bar, and means on the actuator to engage the sliding bar when the actuator has been pushed in for voting and to hold it in said position, the actuators being operated and held in without moving the bar.

29. In a voting machine, a counter, an actuator for the counter, a hook on the actuator, a bar movable across the path of the actuator, and means connected to the bar and adapted to be engaged by the hook on the actuator, without moving the bar.

30. In a voting machine, a counter, an actuator for the counter, a hook on the actuator, a sliding bar movable across the path of the actuator, and means connected to the bar and adapted to be engaged by the hook on the actuator, without moving the bar.

31. In a voting machine, a counter, an actuator for the counter, a hook on the actuator, a sliding bar movable across the path of the actuator, and a pivoted catch connected to the bar and adapted to be engaged by the hook on the actuator.

32. In a voting machine, a counter, an actuator for the counter, a hook on the actuator, a sliding bar movable across the path of the actuator and a spring catch connected to the bar and adapted to be engaged by the hook on the actuator.

33. A voting machine comprising a suitable number of cases, a counter for each case, an actuator for each counter having means thereon adapted to engage a device movable across the cases, and a device movable across the cases to be engaged by means on the actuator when in one position and to release said means when moved to another position.

34. In a voting machine, a counter, an actuator for the counter, a hook on the actuator, a sliding bar movable across the path of the actuator and a spring controlled pivoted catch connected to the bar and adapted to be engaged by the hook on the actuator.

35. A voting machine comprising a suitable number of cases, a counter for each case, an actuator for each counter, means on said actuator to engage means on a movable bar, a movable bar having means thereon to be engaged by the means on the actuator when the bar is in one position and to release said means on the actuator when the bar is moved to another position.

36. A voting machine comprising a suitable number of cases, a counter for each case, an actuator for each counter, a hook on each actuator, a bar movable across a plurality of cases and means connected to the bar to be engaged by the hook on the actuator when the bar is in one position and to release the hook when the bar is moved to another position.

37. A voting machine comprising a number of separate grouped cases, a counting device in each case, an actuator for each counting device, a catch bar extending across a plurality of the cases and arranged to be engaged by the several actuators when in one position, said bar being constructed to disengage from the actuators when it is moved to another position.

38. A voting machine comprising a plurality of separate cases, each provided with a counting device, an actuator for each counting device, provided with a hook, a bar crossing a plurality of cases, having suitable catches arranged to come in contact with and be engaged by the several actuator hooks, and means for sliding said bar and moving its catches away from the hooks and thereby releasing the actuators, substantially as described.

39. In a voting machine, actuators and counters, a device having means thereon adapted to move all the actuators of the machine to their set or operative position, a barrier, and means connecting the barrier and the device.

40. In a voting machine, counters and actuators, a device having cams thereon adapted to move all the actuators of the machine to their set or operative position, a barrier, and means connecting the barrier and the said device.

41. In a voting machine, actuators and registers, a bar having means adapted to move all the actuators of a voting machine to their set or operative position, a barrier, and means for connecting the barrier and the bar.

42. In a voting machine, actuators and registers, a series of connected cams adapted to move all the actuators of a machine to their set or operative position, a barrier, and means connecting the barrier and the cams.

43. In a voting machine, counters and actuators, a sliding bar having means adapted to move all the actuators of a voting machine to their set or operative position, a barrier, and means connecting the barrier and the sliding bar.

44. In a voting machine, counters and actuators, a sliding bar having cams adapted to move all the actuators of a voting machine to their set or operative position.

45. In a voting machine, counters and actuators, a sliding bar adapted to contact directly with all the actuators thereof and to hold all said actuators in a locked position, a barrier, and means for connecting the barrier and the sliding bar.

46. In a voting machine, counters and actuators, a bar having a part thereof mutilated or notched, the unmutilated part adapted to hold all the actuators of a voting machine in a locked out position, a barrier, and means connecting the barrier and the bar.

47. In a voting machine, counters and actuators, a sliding bar having one of its edges mutilated, the unmutilated part of the edge adapted to contact with actuators to hold said actuators in a locked out position, a barrier, and means connecting the barrier and the sliding bar.

48. In a voting machine, counters and actuator, a device having means thereon adapted to move the actuators out, means to lock all the actuators in said position, a barrier, and means connecting the barrier and said device.

49. In a voting machine, counters and actuators, a device having cams adapted to move the actuators of a voting machine out, means to lock all the actuators in said position, a barrier, and means for connecting the barrier and said device.

50. In a voting machine, counters and actuators, a device having means adapted to move the actuators of the voting machine out, means to lock all the actuators in said position, a barrier and means for connecting the said barrier and device.

51. In a voting machine, counters and actuators, a bar carrying cams adapted to move actuators out, means to lock all the actuators in said position, a barrier, and means for connecting the barrier and said bar.

52. In a voting machine, counters and actuators, a bar having cams adapted to move the actuators of a voting machine out, one part of said bar being adapted to lock all the actuators in said position, a barrier, and means connecting the barrier and said bar.

53. In a voting machine, counters and actuators, a sliding bar having means adapted to move the actuators of a voting machine out, means to lock all of them in said position, a barrier, and means connecting the barrier and the said sliding bar.

54. In a voting machine, counters and actuators, a sliding bar having cams adapted to move the actuators of a voting machine out, one part of said bar being adapted to lock all the actuators in said position, a barrier, and means connecting the barrier and the said sliding bar.

55. In a voting machine, counters and actuators, a device having means thereon adapted to move the actuators out and means adapted to lock the actuators in said position when said device is moved in one direction, and to unlock them when moved in another direction, a barrier, and means connecting the barrier and the said device.

56. In a voting machine, counters and actuators, a device havings cams thereon adapted to move the actuators of a voting machine out, and means for holding the actuators in said position when moved in one direction and to unlock them when moved in another direction, a barrier, and means connecting the barrier and the said device.

57. In a voting machine, counters and actuators, a bar having means adapted to move the actuators of a voting machine out, and means to lock them in said position when moved in one direction and to unlock them when moved in another direction, a barrier, and means connecting the barrier and the said bar.

58. In a voting machine, counters and actuators, a bar having cams connected thereto, adapted to move the actuators of a voting machine out, means to lock them in said position when moved in one direction and to unlock them when moved in another direction, a barrier, and means connecting the barrier and the said bar.

59. In a voting machine, counters and actuators, a sliding bar having cams connected thereto, adapted to move the actuators of a voting machine out, one part of said bar being adapted to lock the actuators in said position when moved in one direction and to unlock them when moved in another direction, a barrier, and means connecting the bar and the said barrier.

60. In a voting machine, counters and actuators, a sliding bar having means adapted to move the actuators of a voting machine out, means to lock the actuators in said position when moved in one direction and to unlock them when moved in another direction, a barrier, and means connecting the barrier and said sliding bar.

61. In a voting machine, counters and actuators, a sliding bar having cams connected thereto adapted to move the actuators of a voting machine out, means to lock them in said position when moved in one direction and to unlock them when moved in another direction, a barrier, and means connecting the barrier and the said sliding bar.

62. In a voting machine, counters and actuators, a sliding bar having cams connected thereto, adapted to move the actuators of a voting machine out, one part of said bar being adapted to lock the actuators in said position when moved in one direction and to unlock them when moved in another direction, a barrier, and means connecting the barrier and the said sliding bar.

63. In a voting machine, counters and actuators, a bar having notches, each notch having a beveled or inclined surface adapted to move the actuators of a voting machine to their set or operative position, a barrier, and means connecting the barrier and the said bar.

64. In a voting machine, counters and actuators, a sliding bar having notches, each notch having a beveled or inclined surface, adapted to move the actuators of a voting machine to their set or operative position, a barrier, and means connecting the barrier and the said sliding bar.

65. In a voting machine, counters and actuators, a bar having notches and unmutilated surfaces, each notch having a beveled or inclined surface adapted to move the actuators out, the unmutilated surfaces of the bar being adapted to lock or hold the actuators in said position, a barrier, and means connecting the barrier and the said bar.

66. In a voting machine, counters and actuators, a sliding bar having notches and unmutilated parts, each notch having a beveled or inclined surface, adapted to move the actuators out, the unmutilated parts being adapted to lock or hold said actuator in said position, a barrier, and means for connecting the barrier and the sliding bar.

67. A sliding bar for a voting machine, having notches, cut in an edge thereof, with an unmutilated part of the edge between the notches, each notch having a beveled or inclined surface adapted to move the actuators of a voting machine out, the unmutilated edge being adapted to lock or hold the actuators in said position, and a plate on the face of the bar, as and for the purpose set forth.

68. A sliding bar for a voting machine, having notches, in one of its edges, each notch having a beveled or inclined surface, an unmutilated part of the edge being between the notches and a plate on each face of the bar.

69. In a voting machine, counters and actuators, a bar having notches and unmutilated surfaces, each notch having a beveled or inclined surface adapted to move the actuators out, and the unmutilated surfaces of the bar adapted to lock or hold the actuators in said position when moved in one direction, a barrier, and means connecting the barrier and said bar.

70. In a voting machine, counters and actuators, a sliding bar having notches and mutilated parts, each notch having a beveled or inclined surface adapted to move the actuators out, the unmutilated parts being adapted to lock or hold the actuator in said position when moved in one direction and to unlock them when moved in another direction, a barrier, and means for connecting the barrier and the said sliding bar.

71. A sliding bar for a voting machine, having notches, cut in an edge thereof, with an unmutilated part of the edge between the notches, each notch having a beveled or inclined surface, adapted to move the actuators of a voting machine out, the unmutilated edge being adapted to lock or hold the actuators in said position when moved in one direction and to unlock them when moved in another direction, and a plate on a face of the bar, as and for the purpose set forth.

72. In a voting machine, movable indicators, counters controlled thereby, a movable device having means thereon adapted to move and hold the indicators locked when moved in one direction, a barrier and means connecting the barrier and said device.

73. In a voting machine, movable indicators, counters controlled thereby, a movable device having means thereon adapted to hold an indicator in a locked position when the indicator has been operated for voting, said device adapted to restore and hold the indicator in its normal position, a barrier and means for connecting the barrier and said device.

74. A movable device for a voting machine having means thereon adapted to hold an indicator of a voting machine locked when the indicator has been voted, said device also adapted to restore and hold the indicator in its normal position.

75. A movable device having a spring catch thereon adapted to hold an indicator of a voting machine locked when the indicator has been moved for voting, said device also adapted to be moved to release the indicator and adapted to restore and hold the indicator in its normal position.

76. A movable bar for a voting machine having means thereon movable independently of the bar and adapted to hold a plurality of indicators of a voting machine locked when the indicators have been operated for voting, said bar adapted to be moved to release the indicators and adapted to restore and hold the indicators in their normal position.

77. In a voting machine, movable indicators, counters controlled thereby, a movable device having means thereon adapted to positively move and hold the indicators locked when moved in one direction.

78. A sliding bar for a voting machine having means thereon movable independently of the bar and adapted to hold a series of indicators of a voting machine locked when the indicators have been moved for voting, said bar also adapted to be moved to release the indicators.

79. A movable bar for a voting machine having a pivoted catch thereon adapted to hold an indicator of a voting machine locked when said indicator has been moved for voting, said bar adapted to be moved to release the indicator, to restore and hold the indicator in its normal position.

80. A movable bar for a voting machine having a spring pressed catch thereon movable independently thereof and adapted to hold an actuator of a voting machine in a locked in position when the actuator has been pushed in, said bar being movable to release the actuator.

81. A sliding bar for a voting machine having a pivoted catch thereon adapted to hold an actuator of a voting machine in a locked in position when the actuator has been pushed in.

82. A sliding bar for a voting machine having a spring pressed catch thereon adapted to hold an actuator of a voting machine in a locked in position when the actuator has been pushed in.

83. A bar for a voting machine having notches therein, and pivoted means in each notch adapted to hold an actuator of a voting machine in a locked in position when the actuator has been pushed in.

84. A bar for a voting machine having notches therein, and spring pressed means in each notch adapted to hold an actuator of a voting machine in a locked in position when the actuator has been pushed in.

85. A bar for a voting machine having notches therein, and a pivoted catch in each notch adapted to hold an actuator of a voting machine in a locked in position when the actuator has been pushed in.

86. A bar for a voting machine having notches therein, a spring pressed catch in each notch adapted to hold an actuator of a voting machine in a locked in position when the actuator has been pushed in.

87. A sliding bar for a voting machine, having notches therein and pivoted means in each notch adapted to hold an actuator of a voting machine in a locked in position when the actuator has been pushed in.

88. A sliding bar for a voting machine having notches therein and spring pressed means in each notch adapted to hold an actuator of a voting machine in a locked in position when the actuator has been pushed in.

89. A sliding bar for a voting machine having notches therein, a pivoted catch in each notch to hold an actuator of a voting machine in a locked in position when the actuator has been pushed in.

90. A sliding bar for voting machine having notches, therein, a spring pressed catch in each notch adapted to hold an actuator of a voting machine in a locked in position when the actuator has been pushed in.

91. A device for a voting machine having pivoted means thereon adapted when said device is in one position to hold an indicator locked when the indicator of a voting machine has been operated for voting, and adapted when moved to another position to release the indicator and to restore and hold the indicator in its normal position.

92. A device for a voting machine movable to two positions and having a series of means, one for each indicator of a voting machine, controlled by a spring and adapted when in one position to hold the indicator of a voting machine locked when the indicator hase been voted, and adapted when moved to another position to release the indicator and to restore and hold it in its normal position.

93. A device for a voting machine movable to two positions and having a series of pivoted catches, one for each indicator, adapted to hold the indicators of a voting machine locked when the indicators have been operated for voting, and adapted to be moved in another direction to release the indicators and to restore and hold them in their normal position.

94. A device for a voting machine movable to two positions and having a series of pivoted catches, one for each indicator, adapted to hold the indicators of a voting machine locked when the indicators have been moved for voting, and adapted when moved to another position to release the indicators and to restore and hold them in normal position.

95. A bar for a voting machine movable to two positions, and having a series of pivoted means, one for each indicator, adapted to hold the indicators of a voting machine locked when the indicators have been moved for voting, and adapted when moved to another position to release the indicators and to restore and hold them in their normal position.

96. A bar for a voting machine movable to two positions and having spring-pressed pivoted means adapted to hold an indicator of a voting machine locked when the indicator has been moved for voting, and adapted when moved in another position to release the indicator and restore and hold it in its normal position.

97. A sliding bar for a voting machine having a series of pivoted means adapted to hold the actuators of a voting machine in a locked in position when the actuators have been pushed in, and adapted when moved in another position to release the actuators.

98. A sliding bar for a voting machine having a series of spring pressed means adapted to hold the actuators of a voting machine in a locked in position when the actuators have been pushed in, and adapted when moved in another position to release the actuators.

99. A bar for a voting machine having a series of pivoted catches adapted to hold the indicators of a voting machine locked when the indicators have been operated for voting, and adapted when moved in another position to release the indicators to restore and hold them in normal position.

100. A bar for a voting machine having a series of spring-pressed catches adapted to hold the indicators of a voting machine locked when the indicators have been moved for voting, and adapted when moved in another position to release the indicators to restore and hold them in their normal position.

101. A sliding bar for a voting machine having a series of pivoted catches adapted to hold the actuators in a locked in position when the actuators have been pushed in and adapted when moved in another position to release the actuators.

102. A sliding bar for a voting machine, having a series of spring pressed catches adapted to hold the actuators of a voting machine in a locked in position, when the actuators have been pushed in, and adapted when moved in another position to release the actuators.

103. A bar for a voting machine movable in two directions and having notches therein and pivoted means in each notch adapted to hold an actuator of a voting machine in a locked in position when the actuator has been pushed in, and adapted when moved in another position to release the actuator.

104. A bar for a voting machine movable in two directions and having notches therein, spring pressed means in each notch adapted to hold an actuator of a voting machine in a locked in position when the actuator has been pushed in, and adapted when moved in another position to release the actuator.

105. A bar for a voting machine movable in two directions and having notches therein, and a pivoted catch in each notch adapted to hold an actuator of a voting machine in a locked in position when the actuator has been pushed in and adapted when moved in another position to release the actuator.

106. A bar for a voting machine movable in two directions and having notches therein, a spring pressed catch in each notch adapted to hold an actuator of a voting machine in a locked in position, when the actuator has been pushed in, and adapted when moved in another position to release the actuator.

107. A sliding bar for a voting machine movable in two directions and having notches therein and pivoted means in each notch adapted to hold an actuator of a voting machine in a locked in position, when the actuator has been pushed in, and adapted when moved in another position to release the actuator.

108. A sliding bar for a voting machine movable in two directions and having notches therein and spring pressed means in each notch adapted to hold an actuator of a voting machine in a locked in position when the actuator has been pushed in, and adapted when moved in another position to release the actuator.

109. A sliding bar for a voting machine movable in two directions and having notches therein, a catch in each notch to hold an actuator of a voting machine in a locked in position when the actuator has been pushed in and adapted when moved in another position to release the actuator.

110. A sliding bar for a voting machine movable in two directions and having notches therein, a spring pressed catch in each notch adapted to hold an actuator of a voting machine in a locked in position, and adapted when moved in another position to release the actuator.

111. A movable device for a voting machine having means thereon adapted to move an actuator of a voting machine to its set or operative position and also means movable independently thereof and adapted to hold the actuator in a locked in position when the actuator has been pushed in.

112. A movable device for a voting machine having cams adapted to move the actuators of a voting machine to their set or operative position and means movable independently thereof adapted to hold the actuators in a locked in position when the actuators have been pushed in.

113. A movable bar for a voting machine having means thereon adapted to move an actuator of a voting machine out and also means movable independently thereof adapted to hold the actuators in a locked in position when the actuator has been pushed in.

114. A movable bar for a voting machine having means thereon adapted to move an actuator of a voting machine out and also means movable independently thereof to hold an actuator in a locked in position when the actuator has been pushed in.

115. A device for a voting machine having cams thereon adapted to move the actuators of a voting machine to their set or operative position and catches movable independently thereof adapted to hold the actuators in a locked in position when the actuators have been pushed in.

116. A device for a voting machine having cams adapted to move the actuators of a voting machine to their set or operative position and spring catches adapted to hold the actuators in a locked in position when the actuators have been pushed in.

117. A bar for a voting machine having cams thereon adapted to move the actuators of a voting machine to their set or operative position and catches movable independently thereof and adapted to hold the actuators in a locked in position when the actuators have been pushed in.

118. A bar for a voting machine having cams adapted to move the actuators for a voting machine to their set or operative position and spring catches adapted to hold the actuators in a locked in position when the actuators have been pushed in.

119. A sliding bar for a voting machine having cams thereon adapted to move the actuators of a voting machine to their set or operative position and catches movable independently thereof and adapted to hold the actuators in a locked in position when the actuators have been pushed in.

120. A sliding bar for a voting machine having cams adapted to move the actuators of a voting machine to their set or operative position and spring catches adapted to hold the actuators in a locked in position when the actuator has been pushed in.

121. A bar for a voting machine having notches, each notch having a beveled or inclined surface adapted to move an actuator of a voting machine to its set or operative position, said bar also having means movable independently thereof and adapted to hold the actuator in a locked in position when the actuator has been pushed in.

122. A bar for a voting machine having notches, each notch having a beveled or inclined surface adapted to move an actuator of a voting machine to its set or operative position, said bar also having a catch movable independently thereof and adapted to hold the actuator in a locked in position when the actuator has been pushed in.

123. A bar for a voting machine having notches, each notch having a bevel or incline surface adapted to move an actuator of a voting machine to its set or operative position, said bar also having a spring catch to hold the actuator in a locked in position when the actuator has been pushed in.

124. A sliding bar for a voting machine having notches, each notch having a bevel or incline surface adapted to move an actuator for a voting machine to a set or operative position, said bar also having means movable independently thereof and adapted to hold the actuator in a locked in position when the actuator has been pushed in.

125. A sliding bar for a voting machine having notches, each notch having a bevel or incline surface adapted to move an actuator of a voting machine to a set or operative position, said bar also having a catch movable independently thereof and adapted to hold the actuator in a locked in position when the actuator has been pushed in.

126. A sliding bar for a voting machine having notches, each notch having a bevel or incline surface adapted to move an actuator of a voting machine to a set or operative position, said bar also having a spring catch to hold the actuator in a locked in position when the actuator has been pushed in.

127. A sliding bar for a voting machine having notches therein each notch having a bevel or incline surface adapted to move an actuator of a voting machine to its set or operative position, a spring catch in each of said notches to hold the actuator in a locked in position when an actuator has been pushed in, and a plate on a side of the bar.

128. A device for a voting machine having means thereon adapted to move an actuator of a voting machine out, means to hold it in said position, and also means movable independently thereof and adapted to hold the actuator in a locked in position when the actuators have been pushed in.

129. A device for a voting machine having cams adapted to move the actuators of a voting machine out, means to hold the actuators in said position and means movable independently thereof and adapted to hold the actuators in a locked in position when the actuators have been pushed in.

130. A device for a voting machine having means thereon adapted to move an actuator of a voting machine out, means to hold the actuator in said position and a catch on said device movable independently thereof and adapted to hold the actuator in a locked in position when an actuator has been pushed in.

131. A device for a voting machine having means thereon adapted to move an actuator of a voting machine out, means to hold the actuator in said position and a spring pressed catch on said device movable independently thereof and adapted to hold the actuator in a locked in position when the actuator has been pushed in.

132. A device for a voting machine having cams adapted to move the actuators of a voting machine out and means thereon to hold the actuators in said position and catches on said device movable independently thereof and adapted to hold the actuators in a locked in position when the actuators have been pushed in.

133. A device for a voting machine having cams adapted to move the actuators of a voting machine out and means thereon to hold the actuators in said position, and spring pressed catches on said device to hold the actuators in a locked in position when the actuators have been pushed in.

134. A bar for a voting machine having means thereon adapted to move an actuator of a voting machine out, means to hold the actuator in said position and means independently thereof and adapted to hold the actuator in a locked in position when the actuator has been pushed in.

135. A bar for a voting machine having means adapted to move an actuator of a voting machine out, means to hold the actuator in said position and means pressed by a spring to hold the actuator in a locked in position when the actuator has been pushed in.

136. A bar for a voting machine having cams thereon adapted to move the actuators of a voting machine out, means to lock the actuators in said position and means movable independently thereof and adapted to hold the actuator in a locked in position when the actuators have been pushed in.

137. A bar for a voting machine having cams thereon adapted to move the actuators of a voting machine out, means to lock the actuators in said position and catches movable independently thereof and adapted to hold the actuators in a locked in position when they have been pushed in.

138. A bar for a voting machine having cams adapted to move the actuators of a voting machine out, means to hold the actuators in said position and spring pressed catches to hold the actuators in a locked in position when they have been pushed in.

139. A sliding bar for a voting machine having cams thereon adapted to move the actuators of a voting machine out, means to lock the actuators in said position and means movable independently thereof and adapted to hold the actuators in a locked in position when the actuators have been pushed in.

140. A sliding bar for a voting machine having cams thereon adapted to move the actuators of a voting machine out, means to lock the actuators in said position, and catches movable independently thereof and adapted to hold the actuators in a locked in position when they have been pushed in.

141. A sliding bar for a voting machine having cams adapted to move the actuators of a voting machine out, means to lock the actuators in said position and spring pressed catches to hold the actuators in a locked in position when they have been pushed in.

142. A bar for a voting machine having notches therein, each notch having a bevel or incline surface adapted to move an actuator of a voting machine out, the bar having an unmutilated surface adapted to hold the actuator in said position and means on the bar movable independently thereof and adapted to hold the actuator in a locked in position when it has been pushed in.

143. A bar for a voting machine having notches therein, each notch having a bevel or incline surface adapted to move an actuator of a voting machine out, the bar having an unmutilated surface adapted to hold the actuator in a locked out position, and a catch movable independently of the bar and adapted to hold the actuator in a locked in position when it has been pushed in.

144. A bar for a voting machine having notches, each notch having a bevel or incline surface adapted to move an actuator of a voting machine out, the bar having an unmutilated surface adapted to hold the actuator in a locked out position, and a spring pressed catch to hold the actuator in a locked in position when it has been pushed in for voting.

145. A sliding bar for a voting machine having notches, therein, each notch having a bevel or incline surface adapted to move an actuator of a voting machine out, an unmutilated part on said bar adapted to hold the actuator in said position and means on the bar movable independently thereof and adapted to hold the actuator in a locked in position when it has been pushed in.

146. A sliding bar for a voting machine having notches therein, each notch having a bevel or incline surface adapted to move an actuator of a voting machine out, an unmutilated part on said bar adapted to hold the actuator in said position and a catch in each notch movable independently of the bar and adapted to hold the actuator in a locked in position when it has been pushed in.

147. A sliding bar for a voting machine having notches therein, each notch having a bevel or incline surface adapted to move an actuator of a voting machine out, an unmutilated part on said bar adapted to hold the actuator in said position and a spring pressed catch in each notch adapted to hold the actuator in a locked in position when it has been pushed in.

148. A sliding bar for a voting machine having notches in an edge thereof, with unmutilated parts of the edge between the notches, each notch having a bevel or incline surface and a pivoted catch in each notch.

149. A sliding bar for a voting machine having notches in an edge thereof with unmutilated parts of the edge between the notches, each notch having a bevel or incline surface, and a catch in each notch movable independently of the bar.

150. A sliding bar for a voting machine having notches in an edge thereof, with unmutilated parts of the edge between the notches, each notch having a bevel or incline surface, and a spring pressed catch in each notch.

151. A sliding bar for a voting machine, having notches in an edge thereof, with unmutilated parts of the edge between the notches, each notch having a bevel or incline surface and a spring pressed pivoted catch in each notch.

152. In a voting machine, actuators and counters therefor, a bar having notches or recesses therein, each notch having a beveled or inclined surface adapted to move the actuators out, a barrier, and means for connecting the barrier and the bar so that the two may be operated simultaneously.

153. In a voting machine, actuators and counters, a bar having means thereon to hold the actuators in a locked in position, said bar also having recesses therein, one surface of each recess being beveled or inclined and adapted to move the actuators out, the surface of the bottom of each recess being of such a length as to permit the bar to be moved a predetermined distance before operating to move the actuator out, a barrier, and means connecting the barrier and the bar.

154. In a voting machine, actuators and counters, a sliding bar having notches or recesses therein, each notch having a beveled or inclined surface adapted to move an actuator out, means for operating said bar, and a barrier connected to said means so that the bar and barrier may be moved simultaneously.

155. In a voting machine, actuators and counters, a sliding bar having notches or recesses in the edge thereof, each notch having one of its surfaces beveled or inclined, the surface of the bottom of each notch being substantially the same shape as that part of the edge of the bar between the notches, a barrier, and means for connecting the barrier and the bar so that they may be operated simultaneously.

156. A movable device for a voting machine having means thereon adapted to move the actuators of the machine out, means adapted to hold them out when in one position and to release them to permit them to be pushed in, when in another position, said device also having means movable relative thereto to hold the actuator in a locked in position, when the actuator has been pushed in.

157. A movable device for a voting machine having means thereon adapted to move the actuators of the machine out, means adapted to hold them out when in one position, and to release them to permit them to be pushed in, when in another position, said device also having means movable relative thereto, when in one position to hold an actuator in a locked in position when pushed in, and to release the actuator when in another position.

158. A movable device for a voting machine having cams adapted to move actuators out, means adapted to hold them out, when in one position, and to release them to permit them to be pushed in, when in another position, said device also having means movable relative thereto and adapted to hold an actuator in a locked in position, when the actuator has been pushed in.

159. A movable device for a voting machine having cams adapted to move actuators out, means adapted to hold them out, when in one position, and to release them to permit them to be pushed in when in another position, said device also having means movable relative thereto and adapted when in one position to hold an actuator in a locked in position when the actuator has been pushed in, and to release the actuator when in another position.

160. A movable device for a voting machine having means adapted to move actuators out, means adapted to hold them out when in one position and to release them to permit them to be pushed in, when in another position, a catch on said device, movable relative thereto and adapted to hold an actuator in a locked in position when the actuator has been pushed in.

161. A movable device for a voting machine having means adapted to move actuators out, means adapted to hold them out when in one position and to release them to permit them to be pushed in when in another position, catches on said device movable relative thereto and adapted when in one position to hold the actuators in a locked in position, when the actuators have been pushed in and to release the actuators when in another position.

162. A movable device for a voting machine having means adapted to move actuators out, means adapted to hold them out when in one position and to release them to permit them to be pushed in when in another position, spring pressed catches on said device adapted when in one position to hold the actuators in a locked in position when the actuators have been pushed in.

163. A movable device for a voting machine having means adapted to move actuators out, means adapted to hold them out when in one position and to release them to permit them to be pushed in when in another position, spring pressed catches on said device adapted when in one position to hold the actuators in a locked in position when the actuators have been pushed in and to release the actuators when in another position.

164. A movable device for a voting machine having cams adapted to move actuators out, means adapted to hold them out when in one position and to release them to permit them to be pushed in when in another position and a catch on said device movable relative thereto and adapted to hold an actuator in a locked in position when the actuators have been pushed in.

165. A movable device for a voting machine having cams adapted to move actuators out, means adapted to hold them out when in one position and to release them to permit them to be pushed in when in another position, and a catch on said device movable relative thereto and adapted when in one position to hold an actuator in a locked in position when the actuator has been pushed in and to release the actuator when in another position.

166. A device for a voting machine having cams adapted to move actuators out, means adapted to hold them out when in one position and to release them to permit them to be pushed in when in another position, and a spring pressed catch on said device to hold an actuator in a locked in position when pushed in.

167. A device for a voting machine having cams adapted to move actuators out, means adapted to hold them out when in one position and to release them to permit them to be pushed in when in another position, and spring pressed catches on said device adapted when in one position to hold the actuator in a locked in position when the actuators have been pushed in for voting and to release the actuators when in another position.

168. A movable bar for a voting machine having means adapted to move actuators out, means adapted to lock them out when in one position and to release them to permit them to be pushed in when in another position and means movable relative thereto and adapted to hold an actuator in a locked in position when the actuator has been pushed in.

169. A movable bar for a voting machine having means adapted to move actuators out, means adapted to lock them out when in one position and to release them to permit them to be pushed in when in another position and means movable relative thereto and adapted when in one position to hold an actuator in a locked in position when the actuator has been pushed in and to release the actuator when in another position.

170. A bar for a voting machine having means adapted to move actuators out, means adapted to lock them out when in one position and to release them to permit them to be pushed in when in another position and means controlled by a spring to hold an actuator in a locked in position when the actuator has been pushed in.

171. A bar for a voting machine having means adapted to move actuators out, means adapted to lock them out when in one position and to release them to permit them to be pushed in when in another position and means controlled by a spring adapted when in one position to hold an actuator in a locked in position when the actuator has been pushed in for voting and to release the actuator when in another position.

172. In a voting machine, actuators and counters, a bar having cams adapted to move the actuators out, means adapted to lock the actuators out when in one position and to release them to permit them to be pushed in when in another position, means adapted to hold the actuator in a locked in position when the actuator has been pushed in, a barrier, and means connecting the barrier and the bar.

173. In a voting machine, counters and actuators, a bar having cams adapted to move the actuators out, means adapted to lock them out when in one position and to release them to permit them to be pushed in when in another position, means adapted when in one position to hold an actuator in a locked in position when the actuator has been pushed in and to release the actuator when in another position, a barrier, and means connecting the barrier and the bar.

174. In a voting machine, counters and actuators, a bar having cams adapted to move the actuators out, means adapted to lock the actuators out when in one position and to release them to permit them to be pushed in when in another position, catches to hold the actuators in a locked in position when the actuators have been pushed in, a barrier, and means connecting the barrier and the bar.

175. In a voting machine, counters and actuators, a bar having cams adapted to move the actuators out, means adapted to lock them out when in one position and to release them to permit them to be pushed in when in another position, catches adapted when in one position to hold the actuators in a locked in position when the actuators have been pushed in and to release the actuators when in another position, a barrier, and means connecting the barrier and the bar.

176. A bar for a voting machine having cams adapted to move actuators, means adapted to lock the actuators out when in one position and to release them to permit them to be pushed in when in another position and a spring pressed catch to hold an actuator in a locked in position when the actuator has been pushed in.

177. A bar for a voting machine having cams adapted to move actuators out, means adapted to lock them out when in one position and to release them to permit them to be pushed in when in another position and spring pressed catches to hold the actuators in a locked in position when the actuators have been pushed in and to release the actuators when in another position.

178. A sliding bar for a voting machine having cams thereon adapted to move actuators out, means adapted to lock the actuators out when in one position and to release them to permit them to be pushed in, when in another position, and means movable independently of the bar and adapted to hold an actuator in a locked in position when the actuator has been pushed in.

179. A sliding bar for a voting machine having cams thereon adapted to move actuators out when in one position, and to release them to permit them to be pushed in when in another position, and means movable independently of the bar and adapted when in one position to hold an actuator in a locked in position when the actuator has been pushed in and to release the actuator when in another position.

180. A sliding bar for a voting machine having cams thereon adapted to move actuators out, means adapted to lock the actuators out when in one position and to release the actuators to permit them to be pushed in when in another position and catches movable independently of the bar and adapted to hold the actuators in a locked in position when the actuators have been pushed in for voting.

181. In a voting machine, counters and actuators, a bar having cams adapted to move actuators out, means adapted to lock the actuators out when in one position, and to release them to permit them to be pushed in when in another position, catches adapted when in one position to hold the actuators in a locked in position when the actuators have been pushed in and to release the actuators when in another position, a barrier, and means connecting the barrier and the bar.

182. A sliding bar for a voting machine having cams adapted to move actuators out, means adapted to lock the actuators out when in one position and to release them to permit them to be pushed in when in another position, and spring pressed catches adapted to hold the actuators in a locked in position when the actuators have been pushed in.

183. A sliding bar for a voting machine having cams adapted to move actuators out, means adapted to lock the actuators out when in one position and to release them to permit them to be pushed in when in another position, and spring pressed means adapted when in one position to hold an actuator in a locked in position when an actuator has been pushed in for voting and to release the actuators when in another position.

184. A bar for a voting machine having notches, each notch having a bevel or incline surface adapted to move an actuator out, the bar having a surface adapted to hold an actuator out when in one position, and to release the actuator when in another position to permit the actuator to be pushed in, and means on the bar movable relative thereto and adapted to hold an actuator in a locked in position when it has been pushed in.

185. In a voting machine, counters and actuators, a bar having notches, each notch having a bevel or incline surface, adapted to move an actuator out, the bar having a surface adapted to hold the actuator out when in one position and to release the actuator when in another position to permit the actuator to be pushed in, means on the bar adapted when in one position to hold an actuator in a locked in position when an actuator has been pushed in, and to release the actuator when in another position, a barrier, and means connecting the barrier and the bar.

186. In a voting machine, counters and actuators, a bar having notches, each notch having a bevel or incline surface adapted to move an actuator out, the bar having a surface adapted to hold the actuator out when in one position, and to release the actuator to permit the actuator to be pushed in when in another position, a catch in each of said notches to hold an actuator in a locked in position when an actuator has been pushed in, a barrier and means connecting the barrier and the bar.

187. A bar for a voting machine having notches, each notch having a bevel or incline surface adapted to move an actuator out, the bar having a surface adapted to hold the actuator out when in one position, and to release the actuator when in another position to permit the actuator to be pushed in, a spring catch in each of said notches to hold an actuator in a locked in position when an actuator has been pushed in.

188. A bar for a voting machine having notches, each notch having a bevel or incline surface, adapted to move an actuator out, the bar having a surface adapted to hold the actuator out, when in one position, and to release the actuator when in another position to permit the actuator to be pushed in, a movable catch in each of said notches adapted when in one position to hold an actuator in a locked in position when an actuator has been pushed in and to release the actuator when in another position.

189. A bar for a voting machine having notches, each notch having a bevel or incline surface, adapted to move an actuator out, the bar having a surface adapted to hold the actuator out, when in one position, and to release the actuator when in another position to permit the actuator to be pushed in, and a spring pressed catch in each of said notches adapted when in one position to hold an actuator in a locked in position when an actuator has been pushed in, and to release the actuator when in another position.

190. In a voting machine, counters and actuators, a bar having notches, each notch having a bevel or incline surface, adapted to move an actuator out, the bar having a surface between the notches adapted to hold an actuator out when in one position and to release an actuator when in another position to permit the actuator to be pushed in, means on the bar movable relative thereto and adapted to hold the actuator in a locked in position when the actuator has been pushed in, a barrier, and means connecting the barrier and the bar.

191. A movable bar for a voting machine having notches, each notch having a bevel or incline surface adapted to move an actuator out, the bar having a surface between the notches adapted to hold an actuator out when in one position and to release the actuator when in another position to permit the actuator to be pushed in, and means on the bar movable relative thereto and adapted when in one position to hold an actuator in a locked in position when an actuator has been pushed in and to release the actuator when in another position.

192. A sliding bar for a voting machine having notches, each notch having a bevel or incline surface adapted to move an actuator out, the bar having a surface adapted to hold an actuator out when in one position and to release an actuator when in another position to permit the actuator to be pushed in and means on the bar movable relative thereto and adapted to hold an actuator in a locked in position when the actuator has been pushed in.

193. A sliding bar for a voting machine having notches, each notch having a bevel or incline surface adapted to move an actuator out, the bar having a surface adapted to hold the actuator out when in one position, and to release the actuator when in another position to permit the actuator to be pushed in, and means on the bar movable relative thereto and adapted when in one position to hold an actuator in a locked in position when an actuator has been pushed in and to release the actuator when in another position.

194. A sliding bar for a voting machine having notches, each notch having a bevel or incline surface adapted to move an actuator out when in one position and to release the actuator when in another position to permit the actuator to be pushed in, and a catch in each of said notches movable relative to the bar and adapted to hold an actuator in a locked in position when the actuator has been pushed in.

195. A sliding bar for a voting machine having notches, each notch having a bevel or incline surface adapted to move an actuator out, the bar having a surface adapted to hold the actuator out when in one position and to release the actuator when in another position to permit the actuator to be pushed in, and a spring catch in each of said notches to hold an actuator in a locked in position when the actuator has been pushed in.

196. A sliding bar for a voting machine having notches, each notch having a bevel or incline surface adapted to move an actuator out when in one position and to release the actuator when in another position to permit the actuator to be pushed in, and a catch movable relative to the bar and in each of said notches adapted when in one position to hold an actuator in a locked in position when the actuator has been pushed in for voting and to release the actuator when in another position.

197. A sliding bar for a voting machine having notches, each notch having a bevel or incline surface adapted to move an actuator out, the bar having a surface adapted to hold the actuator out when in one position and to release the actuator when in another position to permit the actuator to be pushed in and a spring pressed catch in each of said notches adapted when in one position to hold an actuator in a locked in position when an actuator has been pushed in for voting and to release the actuator when in another position.

198. A sliding bar for a voting machine having notches, each notch having a bevel or incline surface adapted to move an actuator out, the bar having a surface between the notches adapted to hold the actuator out when in one position and to release the actuator when in another position to permit the actuator to be pushed in, and means on the bar movable relative thereto and adapted to hold the actuator in a locked in position when the actuator has been pushed in.

199. A sliding bar for a voting machine having notches, each notch having a bevel or incline surface adapted to move an actuator out, the bar having a surface between the notches adapted to hold the actuator out when in one position and to release the actuator when in another position to permit the actuator to be pushed in, and means on the bar movable relative thereto and adapted when in one position to hold the actuator in a locked in position when the actuator has been pushed in and to release the actuator when in another position.

200. A voting machine comprising counters, actuators therefor, a movable bar operating when moved to move the actuators out and to lock all the actuators out when it is placed in a given position, a barrier, and means for connecting the barrier and the bar, so that they will move simultaneously, substantially as described.

201. A voting machine comprising counters, actuators therefor, a positive and direct-acting bar, positively controlled and operating to move the actuators out, and to lock all the actuators out when placed in a given position, a barrier, and means connecting the barrier and the bar.

202. In a voting machine, counters, actuators for the counters, a device directly contacting with all the actuators to lock them out when in a certain position, a barrier, and means connecting the barrier and said device when operating the actuators.

203. In a voting machine, counters, actuators for the counters, means operating to move the actuators out when said means is moved to a given position, a barrier, and means connecting the barrier and said first-mentioned means when operating the actuators.

204. In a voting machine, actuators and counters, means operating to move the actuators out and to lock all of them out, and a barrier connected to said means.

205. In a voting machine, counters, actuators for the counters, means operating to move the actuators out and to lock them out when said means is moved in one direction and to unlock them when moved in another direction, a barrier connected to said means so that the barrier and means may be operated simultaneously.

206. In a voting machine, counters, actuators therefor, and a bar movable in two directions, and means to automatically and to positively move the bar in either direction, said bar directly contacting with the actuators, to resist the operation of all of said actuators.

207. In a voting machine, counters, actuators therefor, a bar movable in two directions and adapted to directly contact with the actuators to resist the operation of the same, and means to automatically and to positively move the bar in either direction, said means being beyond the control of the voter when operating the actuators.

208. In a voting machine, counters, actuators therefor, means sliding across the path of the actuators to reset the same and to prevent the operation of the same, a barrier, and means connecting the barrier and slide means so that the two may be operated simultaneously.

209. In a voting machine, counters, actuators for the counters, means operating against the actuators to move the actuators out, a barrier, and means connecting the first mentioned means so that they may be operated simultaneously.

210. In a voting machine, counters, actuators for the counters, cams operating to move the actuators out, a barrier, and means connecting the said cams to the barrier so that they may be operated simultaneously.

211. In a voting machine, counters, actuators for the counters, cams operating independently of these actuators not voted and against those that have been voted to move said voted actuators out, a barrier and means connecting the barrier and the cams.

212. In a voting machine, counters, actuators therefor, a sliding bar movable transversely across the path of the actuators to move them out, a barrier and means connecting the barrier and the said bar.

213. In a voting machine, counters, actuators therefor, a sliding bar movable across the path of the actuators independently of those actuators not voted and acting to move those voted out, a barrier, and means connecting the barrier and the sliding bar.

214. In a voting machine comprising counters, actuators therefor, a sliding bar having cams thereon, said cams operating to move the actuators out, a barrier, and means connecting the barrier and the sliding bar.

215. In a voting machine, counters, actuators therefor, a bar having inclines or cams thereon said inclines operating independently of those actuators not voted and acting to move those voted, a barrier, and means connecting the barrier and the bar.

216. In a voting machine, counters, actuators therefor, a bar having inclines or cams thereon, said inclines operating freely of those actuators not voted and directly against those voted to move the latter out, a barrier, and means connecting the barrier and the bar.

217. In a voting machine, counters, actuators therefor, a sliding bar having inclines or cams thereon said inclines operating freely of those actuators not voted and acting to move those voted out, a barrier, and means connecting the barrier and the bar.

218. In a voting machine, counters, actuators therefor, a sliding bar having inclines or cams thereon said inclines operating freely of those actuators not voted, and directly against those voted to move the latter out, a barrier, and means connecting the barrier and the bar.

219. In a voting machine, counters, actuators therefor, a sliding bar movable across the path of the actuators to prevent the operation of the same, a barrier, and means connecting the barrier and the said bar.

220. In a voting machine, counters, actuators therefor, a sliding bar movable across the path of the actuators and independently thereof, to prevent the operation of the same, a barrier, and means connecting the barrier and the bar.

221. In a voting machine, counters, actuators therefor, and means for resetting the actuators said means being movable independently of the actuators when the actuators are moved out, and adapted to permit them to be pushed in without operating the means.

222. In a voting machine, counters, actuators therefor, and a bar for setting the actuators said bar being movable independently of the actuators when the actuators are out, and adapted to permit the actuators to be pushed in without operating the bar.

223. In a voting machine, counters, actuators therefor, and a sliding bar for setting the actuators, said bar being movable independently of the actuators when the actuators are out and adapted to permit the actuators to be pushed in without operating the bar.

224. In a voting machine, counters, actuators therefor, means operating to move the actuators out and to lock all the actuators out when said means is moved to a given position, a barrier, and means connecting the barrier and the first mentioned means.

225. In a voting machine, counters, actuators therefor, means operating to move the actuators out, and to lock all the actuators out when said means is moved to a certain position, and to unlock them when moved to a different position, a barrier, and means connecting the barrier and the operating means.

226. In a voting machine, counters, actuators therefor, means operating to move those actuators that have been voted out and to lock all the actuators out when said means is moved to a given position, a barrier, and means connecting the barrier and the operating means.

227. In a voting machine, counters, actuators therefor, means to move those actuators that have been voted out, and to lock all the actuators out when said means is moved to a given position and to unlock all the actuators when moved to another position, and to permit the actuators to be voted, a barrier, and means connecting the said barrier and the means to move the actuators.

228. In a voting machine, counters, actuators therefor, means operating to move those actuators that have been voted out, and to lock all the actuators out when said means is moved to a given position, a barrier and means connecting the said barrier and the operating means, the said operating means being beyond the control of the voter when operating the actuators.

229. In a voting machine, counters, actuators therefor, means adapted to move those actuators that have been voted out, and to lock all the actuators out when said means is moved to a given position, and to unlock all the actuators to permit them to be voted, when moved in another position, a barrier, and means connecting said barrier and the operating means, the connecting means being beyond the control of the voter when operating the actuators.

230. In a voting machine, indicators, counters controlled thereby, a positively controlled bar moving all the indicators to their normal position and controlling the operation of the indicators to prevent the use thereof for vote repeating, a barrier, and means connecting the bar and the barrier.

231. In a voting machine, counters, actuators therefor, a sliding bar directly contacting with the actuators to reset the same and adapted to control the operation of the actuators to prevent the use thereof for vote repeating, a barrier, and means connecting the barrier and the said bar.

232. In a voting machine, counters, actuators therefor, a bar movable across said actuators to reset the same and adapted to control the operation thereof, so as to prevent the use thereof for vote repeating, a barrier and means connecting the barrier and the said bar.

233. In a voting machine, counters, actuators for operating the same, a sliding bar, and means for operating the bar, independently of said actuators, and acting to push them out after they have been pushed in for voting.

234. In a voting machine, counters, actuators therefor, a positively controlled bar, means for operating the bar said bar being adapted to push the actuators out, a barrier, and means connecting the barrier to said operating means.

235. In a voting machine, counters, actuators therefor, a bar operating to push the actuators into position for voting, means for operating said bar and a barrier connected to the operating means, said means being beyond the control of the voter when operating the actuator.

236. In a voting machine, counters, actuators therefor, a bar operating to push the actuator into position for voting, a link connected to said bar, and a lever eccentrically pivoted to said link to operate the bar.

237. In a voting machine, counters, actuators therefor, a bar operating to push the actuators back into set position, a lever eccentrically connected to said bar to operate the same, and a barrier connected to the lever.

238. In a voting machine, counters, actuators therefor and a device moved positively in two directions independently of the actuators and adapted to lock the actuators of the machine out, when in one position and to permit the actuators to be pushed in when in another position, said device being inaccessible to a voter when operating the actuators.

239. In a voting machine, counters, actuators therefor, and a bar moved positively in two directions independently of the actuators and adapted to lock the actuators of the machine out when in one position and to permit the actuators to be pushed in when in another position, said bar being inaccessible to a voter when operating the actuators.

240. In a voting machine, counters, actuators therefor, and a sliding bar moved positively in two directions independently of the actuators and adapted to lock the actuators of the machine out, when in one position and to permit the actuators to be pushed in when in another position, said sliding bar being inaccessible to a voter when operating the actuators.

241. A voting machine comprising counters, actuators therefor, and a movable bar having catches thereon, said catches being movable independently thereof and adapted to be engaged by said actuators as they are operated, and to push them back into place after they have been operated, substantially as described.

242. A voting machine comprising counters, actuators therefor, and a movable bar having catches thereon, said catches being movable independently of the bar and arranged to lock in the actuators as they are operated, and to return them to their original position and lock them out after the vote has been cast, substantially as described.

243. A voting machine comprising counters, actuators therefor, provided with hooks, and a movable bar having catches movable independently thereof and adapted to engage said hooks and an inclined surface between the catches, to push the actuators back into place, substantially as described.

244. A voting machine comprising counters, actuators therefor, provided with hooks, and a sliding bar having catches movable independently thereof and adapted to engage said hooks as the actuators are pressed in, and an inclined surface between said catches to push the actuators back into place, said bar having its catches in line with said hooks as the actuators are being operated, but presenting its unmutilated edge to the actuator hooks after it is moved to return the actuators to their original position, substantially as described.

245. A voting machine comprising counters, actuators therefor, and means positively operated before a voter can leave the machine to push out the actuators that have been voted and to lock them out.

246. A voting machine comprising counters, actuators therefor, and means automatically operated as a voter leaves to force out the actuators that have been voted and to lock them out.

247. A voting machine comprising counters, actuators therefor, means operated as a voter leaves the machine to positively restore the actuators voted, and to lock the actuators in their inoperative position and a barrier connected to the said means.

248. A voting machine comprising counters, actuators therefor, means automatically operated as a voter leaves the machine to positively restore the actuators and to hold all the actuators in an inoperative position and a barrier connected to said means.

249. A voting machine comprising counters, actuators therefor, means to restore them to their original position after they have been pushed in and operated to unlock the actuators as the voter approaches the machine to push the actuators in to cast his vote, and a barrier connected to said means.

250. A voting machine comprising counters, actuators therefor, means to restore them to their original position after they have been pushed in and automatically operated to unlock the actuators as a voter approaches the machine to push the actuators in to vote, and a barrier connected to said means.

251. In a voting machine, actuators, a barrier, and means connected to the barrier for forcing out and holding the actuators locked out while the barrier is open.

252. In a voting machine, actuators, a barrier adapted to cover the actuators and means connected to the barrier for forcing out and holding the actuators locked out while the barrier is removed to uncover the actuators.

253. In a voting machine actuators, a barrier and means connected to the barrier for forcing out and holding the actuators locked out while the barrier is open and for unlocking the actuators when the barrier is closed.

254. In a voting machine, actuators, a barrier adapted to cover the actuators and means connected to the barrier for forcing out and holding the actuators locked out while the barrier is removed from the actuators and to unlock the actuators when the barrier is closed.

255. A voting machine, comprising counters, actuators therefor, a barrier, means connected to the barrier to restore the actuators to their locked out position and to hold them there while the barrier is open.

256. A voting machine, comprising counters, actuators therefor, a barrier to cover the actuators and means connected to the barrier to restore the actuators to their locked out position and to hold them there while the barrier is removed from the actuators.

257. In a voting machine, actuators, a bar controlling said actuators, and a barrier connected to the bar to prevent access to the actuators and to unlock the actuators during the time a voter is beyond the barrier to cast his vote.

258. A voting machine comprising counters, actuators therefor, and means operated to unlock the actuators as the voter approaches the machine to cast his vote and to positively restore the actuators voted as the voter leaves the machine.

259. A voting machine comprising counters, actuators therefor, and means automatically operated to unlock the actuators as the voter approaches the machine, to cast his vote, said means also restoring the actuators as the voter leaves the machine.

260. A voting machine comprising counters, actuators therefor, and means adapted to unlock the actuators as the voter approaches the machine to push in the actuators to vote, and said means also restoring the actuators to the set position and locking them in that position as the voter leaves the machine.

261. A voting machine comprising counters, actuators therefor, and means automatically operated to unlock the actuators as a voter approaches the machine to cast his vote, said means also restoring the actuators voted, and locking all the actuators in a pushed out position as the voter leaves the machine.

262. A voting machine comprising a barrier movable to permit access to the actuators of the machine, counters, actuators for said counters, a device directly contacting with the actuators to push out and to lock said actuators, and means connecting the barrier and locking device, so that the barrier and locking device may be moved simultaneously.

263. A voting machine comprising a barrier movable to permit access to the actuators of the machine, counters, actuators to operate the counters, means to positively move the actuators out when said means is moved to a given position, and means connecting the last mentioned means and the barrier, so that the two may be operated simultaneously.

264. A voting machine comprising a barrier movable to permit access to the actuators of the machine, counters, actuators for the counters, means to positively move the actuators out and to lock them out when said means is moved to a given position, and a link connecting the means and barrier, so that the two may be operated simultaneously.

265. A voting machine comprising a barrier movable to permit access to the actuators of the machine, counters, actuators for said counters, and a device adapted to contact with those actuators that have been voted, and to move them, out, and to hold all the actuators out when the barrier is moved to permit access to the actuators, and to unlock the actuators when the barrier is moved in an opposite position upon the admission of a voter to the actuators, and means connecting the barrier and said device so that the barrier and device may be moved simultaneously.

266. A voting machine comprising a barrier movable to permit access to the actuators of the machine, counters, actuators for said counters, and a device adapted to contact with those actuators that have been voted and to move them out and to hold all the actuators out when the barrier is moved to permit access to the actuators, and to unlock the actuators when the barrier is moved to an opposite position upon the admission of a voter to the actuators, and a link or bar connecting the barrier and device, so that the barrier and said device may be moved simultaneously.

267. A voting machine comprising a barrier movable to permit access to the actuators of the machine, counters, actuators for the counters, means to move the actuators out and to lock them out when said means is moved to a given position, a rod eccentrically pivoted to said means, and a link or bar connected to the barrier and the rod so that the barrier and said means may be operated simultaneously.

268. A voting machine comprising a barrier movable to permit access to the actuators of the machine, counters, actuators for the counters, means to move the actuators out and to lock them out when said means is moved to a given position, and to unlock them when moved to another position, a rod eccentrically pivoted to said means and a link or bar connected to the barrier and to the rod so that the barrier and said means may be moved simultaneously.

269. A voting machine comprising a barrier movable to permit access to the actuators of the machine, counters, actuators for the counters, a device adapted to contact with those actuators that have been voted to move them out, and to hold all the actuators out when the barrier is moved to permit access to the actuators, and to unlock the actuators when the barrier is moved to the opposite position upon the admission of a voter to the actuators, and a link connecting the barrier and said device, and being eccentrically pivoted to said device so that the barrier and device may be moved simultaneously.

270. A voting machine comprising a barrier movable to permit access to the actuators of the machine, counters, actuators for the counters, means to move out the actuators that have been voted, and to lock all the actuators out when said means is moved to a given position, and to unlock them when moved to another position, a rod eccentrically pivoted to said means and a link pivoted to the barrier and to said rod so that the barrier and the said means may be operated simultaneously.

271. A voting machine comprising counters, counter actuators, means covering the actuators and which may be withdrawn to expose said actuators, and connection between said means and actuators to return any actuators that may be pushed in, when said means is moved to expose the actuators.

272. A voting machine comprising counters, counter actuators, a barrier which may be withdrawn to expose the actuators, and connections between the barrier and actuators to return those actuators that may be pushed in when the barrier is moved to expose the actuators.

273. A voting machine comprising counters, counter actuators, means covering the actuators which may be withdrawn to expose said actuators, and connections between said means and actuators to positively return and lock those actuators that may be pushed in, when said means is moved to expose the actuators.

274. A voting machine comprising counters, counter actuators, a barrier which may be withdrawn to expose said actuators, and connections between said barrier and actuators to positively return and lock those actuators that may be pushed in when the barrier is withdrawn to expose the actuators.

275. A voting machine comprising counters, counter actuators, means covering the actuators, which may be withdrawn to expose said actuators, a bar adapted to return those actuators that may be pushed in, and connections between the means and bar, whereby upon moving the means the bar is automatically operated to return said actuators.

276. A voting machine comprising counters, counter actuators, a barrier which may be withdrawn to expose the actuators, means adapted to return those actuators that may be pushed in to their set position, and connections between the barrier and said means whereby upon moving the barrier the means is operated to return the actuators.

277. A voting machine comprising counters, counter actuators, a barrier, which may be withdrawn to expose said actuators, a bar adapted to return those actuators that may have been voted, connections between the barrier and bar, whereby upon moving the barrier the bar is operated to return the actuators.

278. A voting machine comprising counters, counter actuators, a barrier, which may be withdrawn to expose the actuators, a sliding bar adapted to return those actuators voted and to lock out all the actuators, and connections between the barrier and sliding bar, whereby upon withdrawal of the barrier the bar is operated to return and lock the actuators.

279. A voting machine comprising counters, counter actuators, means covering the actuators, which may be withdrawn to expose said actuators, and connections between said means and actuators, to return those actuators voted and to lock all the actuators out, when said means is moved to expose the actuators, and to unlock the actuators when moved to cover the actuators.

280. A voting machine comprising counters, counter actuators, a barrier, which may be withdrawn to expose the actuators, and connections between the barrier and actuators, to positively return those actuators voted, and to lock out all the actuators, when the barrier is moved to expose the actuators and to unlock the actuators when moved to cover the actuators.

281. A voting machine comprising counters, counter actuators, means covering the actuators, which may be withdrawn to expose the actuators, a bar adapted when moved in one direction to return the actuators voted, and to lock all the actuators out, and to unlock the actuators when moved in another direction, and connections between the means and bar whereby upon withdrawal of the means to uncover the actuators the bar is moved to return and lock the actuators and when moved to cover the actuators, to unlock the actuators.

282. A voting machine comprising counters, counter actuators, a barrier covering the actuators, which may be withdrawn to expose the actuators, a bar adapted when moved in one direction to return the actuators voted, and to lock out all the actuators, and to unlock the actuators when moved in another direction, and connections between the barrier and bar whereby upon the withdrawal of the barrier the bar is moved to return and to lock the actuators and when the barrier is moved to cover said actuators, to unlock the actuators.

283. A voting machine comprising counters, counter actuators, means covering the actuators, which may be withdrawn to expose said actuators, a bar adapted when moved in one direction to return those actuators voted, and to lock out all the actuators, and links connecting the said means and the actuators, whereby upon the withdrawal of the means the bar is moved to return and to lock the actuators, and when the means is moved to cover said actuators, to unlock the actuators.

284. A voting machine comprising counters, counter actuators, means covering the actuators, which may be withdrawn to expose the actuators, a bar adapted when moved in one direction to return those actuators voted and to lock out all the actuators when moved in another direction, a pitman connected to said bar and to said means, and a handle pivoted between the pitman and link whereby upon the operation of the handle to withdraw the means the bar is moved to return and lock the actuators, and when moved to cover said actuators, to unlock the actuators.

285. In a voting machine comprising counters and actuators therefor, a bar movable back and forth across the path of movement of the actuators, a barrier, and means connecting the barrier and bar, said bar being adapted to move one, all or a predetermined number of actuators out and to lock them out and to permit them to be moved in and locked in and to be released when the bar is moved in different positions.

286. A voting machine comprising counters, counter actuators, a barrier covering the actuators, which may be withdrawn to expose the actuators, a bar adapted when moved in one direction to return those actuators voted, and to lock out all the actuators when moved in another direction, a pitman connected to said bar, a handle eccentrically pivoted to said pitman, and a link connected with said barrier and with said handle, whereby upon the moving of the handle to withdraw the barrier, the bar is moved to return and lock the actuators, and when moved to cover said actuators, to unlock the actuators.

287. In a voting machine, the combination with a booth having a door through which the voter passes in and out, of a number of cases placed inside the booth, counters in said cases, actuators for said counters, a slide bar to return the actuators to their original position after a vote has been cast, and a connection between the door of the booth and the slide bar whereby when the door is opened, the actuators are returned into position, substantially as described.

288. In a voting machine, the combination of a booth having a door through which the voter passes in and out, of a number of cases placed inside the booth, counters in said cases, actuators for said counters, a slide bar arranged to lock the actuators that are pressed in, means for sliding the bar to unlock the actuators from the bar and pushing them back into place after a vote has been cast, and a connection between the door of the booth and said unlocking means, substantially as described.

289. In a voting machine, the combination with a booth, having a door through which the voter passes in and out, of a number of cases placed inside the booth, counters in said cases, actuators for said counters, a movable catch bar having parts engaged by said actuators as they are pressed in, and parts to force them out as it is being moved, an operating lever for the bar, and a connection between the door of the booth and said lever, substantially as described.

290. In a voting machine, the combination of cases, a counting device in each case, an actuator for said counting device, arranged to slide in the case, and a movable lock gate adapted in one position to cross the line of movement of said actuator to prevent its withdrawal from the case, and in another position to prevent the withdrawal of the actuator from the case, substantially as described.

291. In a voting machine, a series of tierable cases, counters and actuators, for each case, and means in each case adapted when in one position to cross the path of the actuator in the case to prevent its removal from the case and when in another position to prevent the withdrawal of the actuator from the case.

292. In a voting machine, a case, a counter, an actuator arranged to slide in the case, means movable across the actuators, and means for raising and lowering said means, whereby the same may either be placed across the line of movement of said actuators to prevent its withdrawal from the case or moved to allow the actuators to be pulled out from the case.

293. In a voting machine, a detachable actuator, a device for holding the actuator in the machine to prevent its withdrawal and an eccentric for moving the device.

294. In a voting machine, a detachable actuator, a sliding device for holding the actuator in the machine to prevent its withdrawal and an eccentric for moving the device.

295. In a voting machine, a detachable actuator therefor, and an eccentric for attaching the actuator and detaching it from the machine.

296. In a voting machine, the combination of cases, a counting device in each case, an actuator for said counting device, arranged to slide in the case, a lock-gate and means for raising and lowering said gate, whereby the same can either be placed across the line of movement of said actuator to prevent its withdrawal from the case, or removed to allow the actuator to be pulled out, substantially as described.

297. In a voting machine, the combination of cases, a counting device in each case, an actuator for said counting device, arranged to slide in the case, a lock-gate adapted to be raised across the line of movement of said actuator to prevent its withdrawal from the case, and lowered to allow the same to be pulled out, a shaft, and a lever connecting said gate with an eccentric portion on said shaft, said lever operating to raise the gate upon the shaft being given half a revolution in one direction, and to lower it when the shaft is revolved in the reverse direction, substantially as described.

298. In a voting machine, a counter, an actuator arranged to slide in the case, a lock-gate adapted to be moved across the line of movement of said actuator to prevent its withdrawal from the case when in one position and to permit the same to be removed when in another position, an eccentric, and a lever operating to move the gate when the eccentric in one position is moved out of the path of the actuator and to move it in the path of the actuator when moved in another direction.

299. In a voting machine, a case, a counter in the case, a movable actuator for the counter adapted to move in the case, a gate moving across the path of movement of the actuator, a crosspiece on the actuator adapted to come in contact with the gate when the gate is in one position, to prevent the withdrawal of the actuators from the case, a lever pivoted to the case, one arm of the lever being pivotally connected to the gate and the other arm of the lever being slotted, a shaft across the case having an eccentric thereon, working the slotted arm of the lever, adapted to move the lever whereby the gate is moved with or removed from the path of movement of the actuator, so that the actuator may be held in or withdrawn from the case at will.

300. A voting machine comprising a suitable box or frame, cases arranged in one or more rows or tiered therein, a set of registering wheels and an actuator therefor in each case, lock bars, a shaft extending transversely through said box or frame, and through each tier of cases, said shaft having lateral recesses forming eccentric bearings for said bars, and means by which said shaft is revolved when required and held fast when the machine is in operation, substantially as described.

301. In a voting machine, a case, a counter, means for locking the counter when in contact therewith, an actuator for the counter, means movable across the path of the actuator when in one position to prevent the actuator from being withdrawn from the case, and means for simultaneously moving the means for locking part of the counters and means movable across the actuator, so arranged that when in one position the means for locking the counters is drawn out of contact therewith, and the means movable across the path of the actuator is in position to permit the actuator to be withdrawn, and when in another position to move said means in the opposite direction so that the counting device may be locked and the actuator prevented from being withdrawn.

302. In a voting machine, a counter, a lock-bar for locking the counter when in contact therewith, an actuator in each case, a gate movable across the path of the actuator, when in one position to prevent and in another to permit the actuator to be withdrawn from the case, an eccentric to simultaneously move the lock bar and the gate, so arranged that in one position the lock-bar is withdrawn from the counting device and the gate simultaneously removed from the path of the actuator, and when in another position the lock bar is thrown in contact with the counting device and the gate simultaneously moved across the path of the actuator.

303. In a voting machine, the combination of cases, a shaft extending transversely therethrough, having lateral recesses forming eccentric portions in said shaft, an actuator in each case, having a cross bar at its rear end and a lock-gate therefor, the same consisting of a vertically sliding plate adapted to engage said cross bar and a lever fulcrumed in the bottom of the case, having loose connection with said gate at one end and a notch in the other end fitting one of the lateral recesses in said shaft and engaging one of the eccentric portions thereof, whereby upon the rotation of the said shaft a swinging motion is given to said lever and the gate is raised or lowered, substantially as described.

304. In a voting machine, the combination of cases, a shaft extending transversely therethrough, registering wheels mounted in sets on said shaft within each case, a second shaft parallel with said wheel-shaft, lock bars for said wheels, journaled on eccentric portions of said second shaft, means for guiding said bars into engagement each with its respective wheel, an actuator in each case, a lock gate arranged to slide across the line of movement of the said actuator to prevent its withdrawal from the case, a pivoted lever connected at one end with said gate and at its other end with one of the said eccentric portions of the parallel shaft, and means for rocking the latter-named shaft whereby upon the turning of the same the lock-bars for the wheels and lock-gates for the actuators can either be withdrawn from or forced into engagement with the parts respectively controlled thereby, substantially as described.

305. In a voting machine, a box or frame, a series of removable and interchangeable cases therein, registering wheels mounted in sets in each case, an actuator for each set of wheels, a cord or chain arranged to be moved by an actuator when the actuator is operated for voting, and means in each case for securing said cord or chain at suitable places to limit the number of actuators that may be operated for voting.

306. In a voting machine, a box or frame, a series of removable and interchangeable cases therein, registering wheels mounted in sets in each case, an actuator for each set of wheels, a cord or chain passing through the box or frame, and arranged to be moved by an actuator when the actuator is operated for voting, and clamps in each case for securing said cord or chain at suitable places to limit the number of actuators that may be operated for voting, said clamps being inaccessible to the voter.

307. In a voting machine, a box or frame, a series of removable and interchangeable cases therein, registering wheels mounted in sets in each case, an actuator for each set of wheels, a cord or chain passing through the box or frame and arranged to be moved by an actuator when the actuator is operated for voting, clamps in each case for securing said cord or chain at suitable points to limit the number of actuators that may be operated for voting and means for operating said clamps.

308. In a voting machine, the combination of a box or frame, registering wheels mounted in sets therein, an actuator for each set of wheels, a cord or chain suitably fastened at either end and drawn loosely across the path of each actuator, so as to permit of being carried in by the same, and adjusting means, as one or more clamps, to fix said cord or chain at any desired point in its length, whereby the number of actuators that can be operated is limited to suit the requirements of any election, substantially as described.

309. In a voting machine, the combination of a box or frame, cases alined therein, a set of registering wheels in each case, an actuator for each set of wheels, slidable in the case and provided with a rearwardly projecting bar, a cord or chain running inwardly from the sides of the box or frame, through the cases and the actuator bars, and adjusting clamps located on contiguous sides of the cases and operating to fix the cord at suitable points in the machine, substantially as described.

310. In a voting machine, the combination of a box or frame, registering wheels mounted in sets therein, an actuator for each set of wheels, a cord or chain running across the box or frame and arranged so as to be carried in by the several actuators as they are pressed in, clamps fixing said cord or chain at suitable places to limit the number of actuators that can be pressed in, and means for operating said clamps from the rear of the machine, substantially as described.

311. In a voting machine, the combination of a box or frame, cases alined therein, a set of registering wheels, a cord or chain running across the cases, and arranged so as to be carried inward by the actuators therein, suitably-guided clamps and stops coöperating to fix the said cord or chain at suitable points in its course across the cases, screw-bolts engaging said clamps and acting to force the cord or chain against the stops, and means for preventing longitudinal movement of said bolts, substantially as described.

312. In a voting machine, a box or frame, cases tiered therein, a set of registering wheels in each case, an actuator for each set of wheels, a bar in each tier of cases, operating to catch and lock in the actuators when pressed in, when it is in one position and lock them out when it is moved to another position, a cord or chain passing through suitable openings in the box, through each tier of cases, and across the path of the actuator, and arranged so as to be moved by the actuators, when they are voted, means for adjusting the cord so as to permit a predetermined number of actuators to be operated by each voter, and means connecting the bars so that they may be moved simultaneously.

313. In a voting machine, a box or frame, cases tiered therein, a set of registering wheels in each case, an actuator for each set of wheels, a sliding bar in each tier of cases, operating to catch and lock in the actuators when pressed in, when it is in one position, and lock them out when it is moved in another position, a cord or chain passing through suitable openings in the box, through each tier of cases, and across the path of the actuator, and arranged so as to be moved by the actuators, when they are voted, means for adjusting the cord so as to permit a predetermined number of actuators to be operated by each voter, and means connecting the bars so that they may be moved simultaneously.

314. In a voting machine a box or frame, cases tiered therein, a set of registering wheels in each case, an actuator for each set of wheels, a bar in each tier of cases, operating to catch and lock in the actuators when pressed in, when it is in one position and to lock them out when it is moved to another position, a cord or chain passing through suitable openings in the box or frame, through each tier of cases, and across the path of the actuators, and arranged so as to be moved by the actuators, when they are voted, means for adjusting the cord so as to permit a predetermined number of actuators to be operated by each voter, a connecting shaft and pitman adapted to move the bars, a rock-shaft to which said pitman is connected supporting bars for said rock shaft, and means for rocking the last named shaft, substantially as described.

315. In a voting machine, a box or frame, cases tiered therein, a set of registering wheels in each case, an actuator for each set of wheels, a sliding bar in each tier of cases, operating to catch and lock in the actuators when pressed in, when it is in one position, and to lock them out when it is moved to another position, a cord or chain passing through suitable openings in the box or frame, through each tier of cases, and across the path of the actuators, and arranged so as to be moved by the actuators, when they are voted, means for adjusting the cord so as to permit a predetermined number of actuators to be operated by each voter, a connecting shaft and pitman adapted to move the bars, a rock-shaft to which said pitman is connected, supporting bars for said rock-shaft, and means for rocking the last named shaft, substantially as described.

316. In a voting machine, the combination of a box or frame, cases tiered therein, a set of registering wheels in each case, an actuator for each set of wheels, a sliding bar in each tier of cases, operating to catch and lock in the actuators, when pressed in, when it is moved in one direction, and to return them to their original position and lock them out, when it is moved in a reverse direction, a cord or chain running through suitable horizontal and vertical passageways in the box or frame, through each tier of cases, across the several actuators, and through a slot in the sliding bars where it meets the same, said cord or chain being adjustable so as to permit a predetermined number of the actuators to be operated by one voter, a connecting shaft and pitman adapted to slide said bars in and out, a rock-shaft to which said pitman is connected, supporting bars for said rock shaft, and means for rocking the last named shaft, substantially as described.

317. In a voting machine, a series of tiered cases, a set of registering wheels in each case, an actuator for each set of wheels, bars in each tier of cases, adapted to lock in the actuators when they are pressed in when in one position, and to return the actuators and lock them out when the bars are in another position, means connecting all the bars, a pitman connected to said means, a rock shaft to which the pitman is connected, means for rocking said shaft, a barrier or screen adapted to cover the actuators when in one position and to uncover them when in another position, and connections between the means for rocking the shaft and the barrier or screen so that upon moving the barrier or screen, the bars will be simultaneously and automatically operated as and for the purpose set forth.

318. In a voting machine, a series of tiered cases, a set of registering wheels in each case, an actuator for each set of wheels, sliding bars in each tier of cases, adapted to lock in the actuators when they are pressed when in one position, and to return the actuators and lock them out when the bars are in another position, means connecting all the bars, a pitman connected to said means, a rock-shaft to which the pitman is connected, means for rocking said shaft, a barrier or screen adapted to cover the actuators when in one position and to uncover them when in another position, and connections between the means for rocking the shaft and the barrier or screen so that upon moving the barrier or screen, the bars will be simultaneously and automatically operated, as and for the purpose set forth.

319. The combination of a key-board, keys and interlocking mechanisms, said keys being movable in directions at right angles to the face of the key-board to operate the interlocking mechanisms and counters, an inclosing booth and a barrier having an entrance movement which permits a voter to pass the barrier and gain access to the voting keys and an exit movement, connections between the barrier and keys to push out and lock the latter in the exit movement of the barrier and to hold said keys locked until unlocked by said entrance movement of said barrier.

320. The combination of a key-board, counters, voting keys and interlocking mechanisms, said keys being movable to operate the interlocking mechanisms and counters, an inclosing booth and a movable barrier which when in one position permits a voter to gain access to the voting keys and when in another position prevents a voter from gaining access to the voting keys, connections between the barrier and the keys to restore and lock the latter on one movement of the barrier and to hold said keys locked until unlocked by another movement of said barrier.

321. A voting machine including a casing, actuators on said machine, a bar movable across the path of the actuators, means extending outside said casing for actuating said bar to positively move those actuators voted to unvoted position and to hold them locked in unvoted position.

322. A voting machine including a casing, actuators on said machine, a bar longitudinally movable and movable transversely of the path of the actuators, means extending outside said casing for actuating said bar to positively move those actuators voted to unvoted position and to hold them locked in unvoted position.

In testimony whereof, I have signed this specification in the presence of two subscribing witnesses.

JAMES C. GARRETT.

Witnesses:
W. W. DAVIDSON,
CHAS. HENDERSON.

---

It is hereby certified that the assignee in Letters Patent No. 1,131,363, granted March 9, 1915, upon the application of James C. Garrett, of San Francisco, California, for an improvement in "Voting-Machines," was erroneously described and specified as "George T. Cranmer, Clerk of the United States Circuit Court for the District of New Jersey, as Trustee," whereas said assignee should have been described and specified as *George T. Cranmer, Clerk of the United States District Court for the District of New Jersey, as Trustee*, by mesne assignments of the entire interest in said invention, as shown by the records of assignments in this office; and that the said Letters Patent should be read with this correction therein that the same may conform to the record of the case in the Patent Office.

Signed and sealed this 2d day of April, A. D., 1918.

[SEAL.]

J. T. NEWTON,
*Commissioner of Patents.*

Cl. 235—55.